United States Patent
Sakurai et al.

[11] Patent Number: 6,128,036
[45] Date of Patent: Oct. 3, 2000

[54] STILL PICTURE RECORDING DIGITAL CAMERA WITH OUTPUT UNIT HAVING DELAY UNIT AND MEMORY

[75] Inventors: Hiroshi Sakurai; Hiroyasu Ohtsubo; Kouji Asada, all of Yokohama; Masaru Noda, Kanagawa-ken; Noriyuki Iura, Yokohama; Takuya Imaide, Fujisawa; Junji Kamimura; Hiroyuki Komatsu, both of Yokohama; Toshiro Kinugasa, Hiratsuka, all of Japan

[73] Assignee: Hitachi, Ltd., Tokyo, Japan

[21] Appl. No.: 09/401,940

[22] Filed: Sep. 23, 1999

Related U.S. Application Data

[62] Division of application No. 08/921,569, Sep. 2, 1997, Pat. No. 5,990,946, which is a division of application No. 08/461,519, Jun. 5, 1995, Pat. No. 5,726,707, which is a division of application No. 08/164,798, Dec. 10, 1993, Pat. No. 5,512,945.

[30] Foreign Application Priority Data

Dec. 11, 1992 [JP] Japan ................................ 4-331393
Dec. 21, 1992 [JP] Japan ................................ 4-339975

[51] Int. Cl.⁷ ............................ H04N 5/262; H04N 9/07
[52] U.S. Cl. ....................... 348/222; 348/239; 348/279
[58] Field of Search ................................ 348/222, 239, 348/240, 266, 268, 272, 273, 279; H04N 5/262, 9/04, 9/07

[56] References Cited

U.S. PATENT DOCUMENTS

| | | |
|---|---|---|
| 4,553,170 | 11/1985 | Aoki et al. . |
| 4,746,988 | 5/1988 | Nutting et al. . |
| 4,763,204 | 8/1988 | Kinoshita et al. . |
| 5,202,756 | 4/1993 | Sasaki . |
| 5,459,520 | 10/1995 | Sasaki . |
| 5,528,292 | 6/1996 | Ikeda . |
| 5,541,648 | 7/1996 | Udegawa . |
| 5,581,298 | 12/1996 | Sasaki . |
| 5,740,303 | 4/1998 | Ban . |

FOREIGN PATENT DOCUMENTS

| | | |
|---|---|---|
| 63-114487 | 5/1988 | Japan . |
| 3-76394 | 4/1991 | Japan . |

*Primary Examiner*—Sherrie Hsia
*Attorney, Agent, or Firm*—Antonelli, Terry, Stout & Kraus, LLP

[57] ABSTRACT

A still picture recording digital camera including a light quantity limiter for interrupting incident light to the camera; an image pickup unit including a pixel for converting the incident light to an electric pixel signal and outputting the pixel signal as a digital image signal; a signal processor for generating a digital image signal having a predetermined format; a recording unit for recording the digital image signal output from the image pickup unit or the signal processor; the light quantity limiter limiting the incident light quantity to a predetermined quantity and then interrupting the incident light; the image pickup unit outputting a dynamic picture digital image signal when the light quantity limiter is limiting the incident light quantity, and outputting a still picture image signal after the light quantity limiter has interrupted the incident light; and the signal processor performing different signal processing operations when the signal processor has received a digital image signal for a dynamic picture and a digital image signal for a still picture.

8 Claims, 36 Drawing Sheets

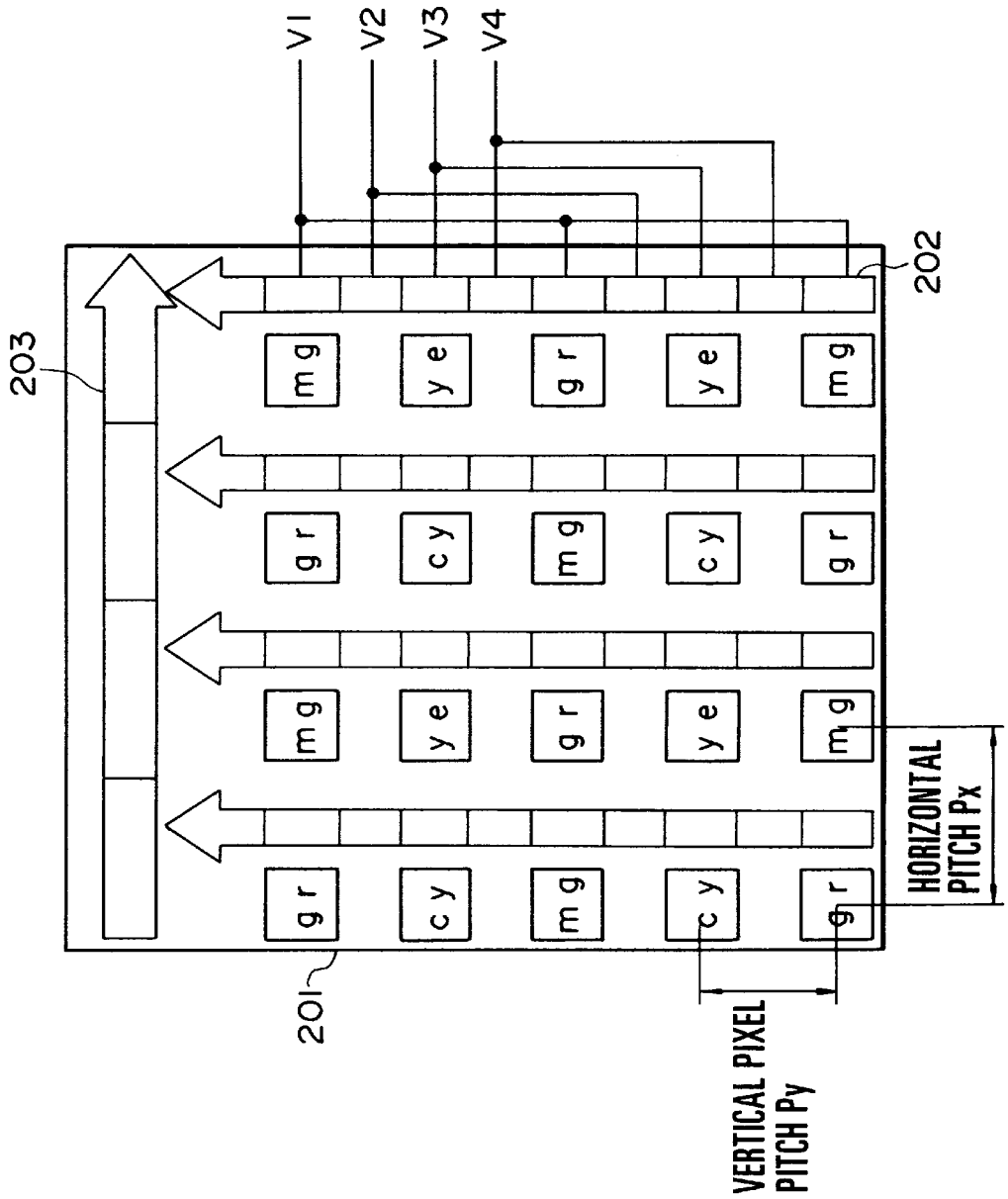

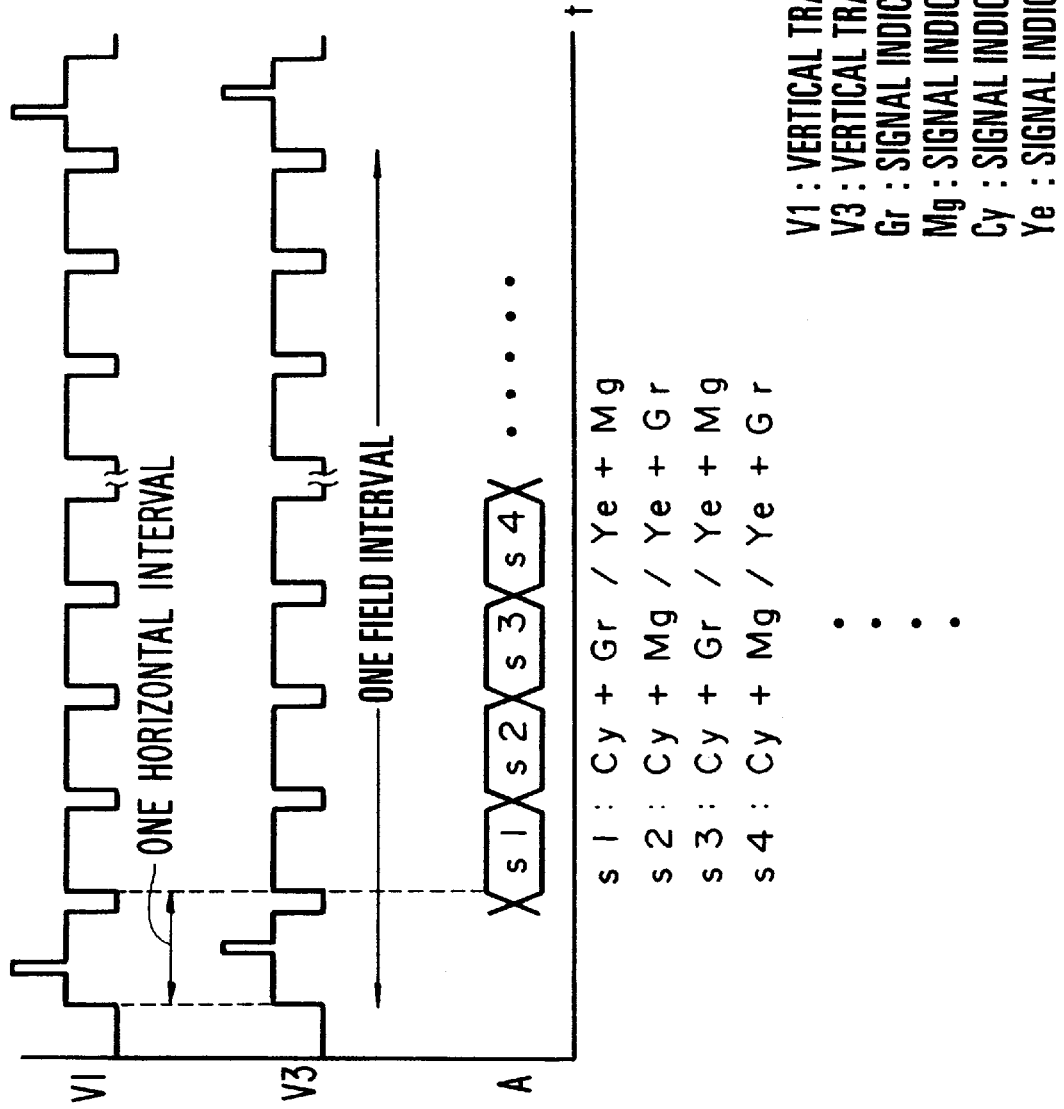

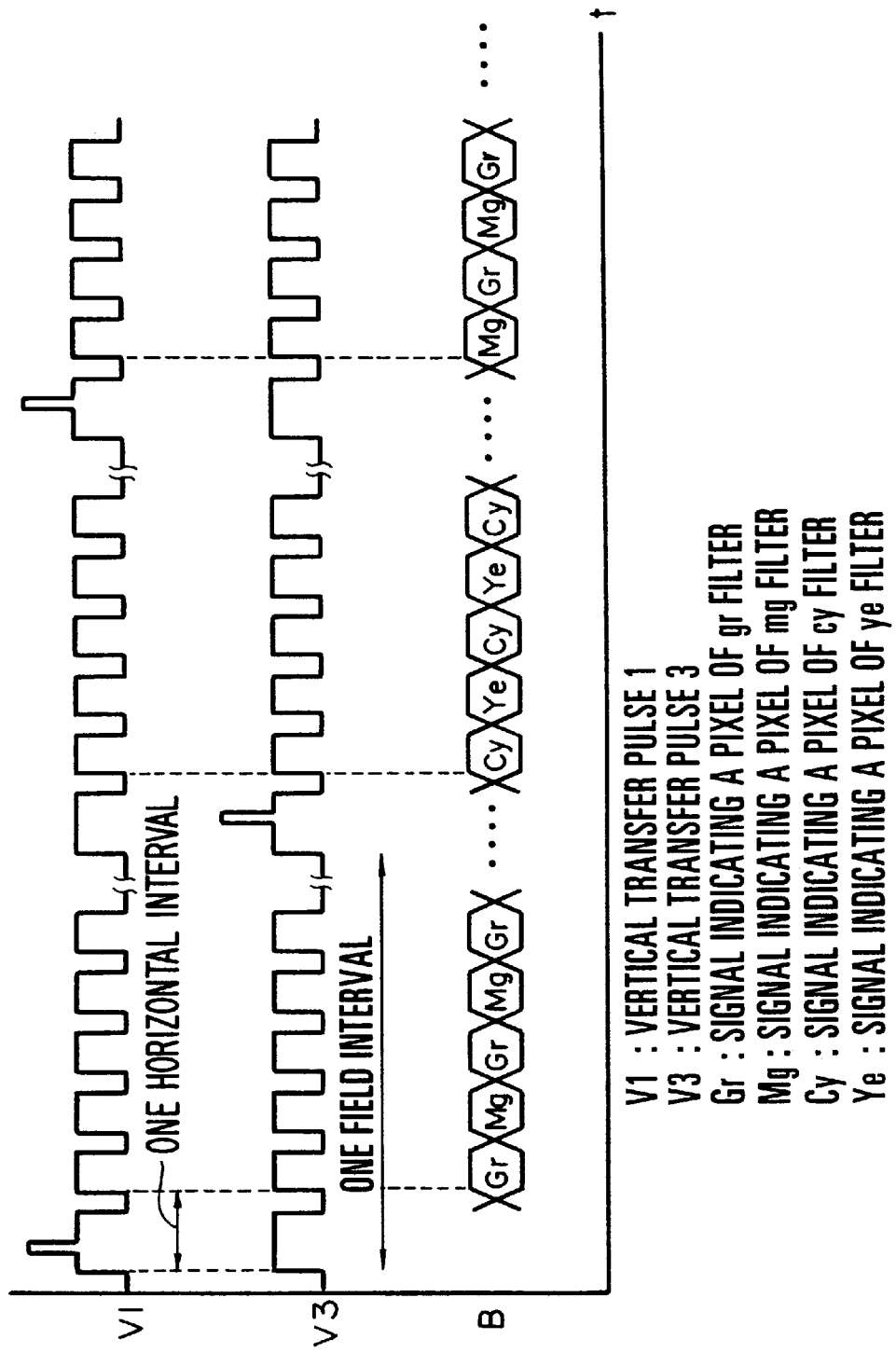

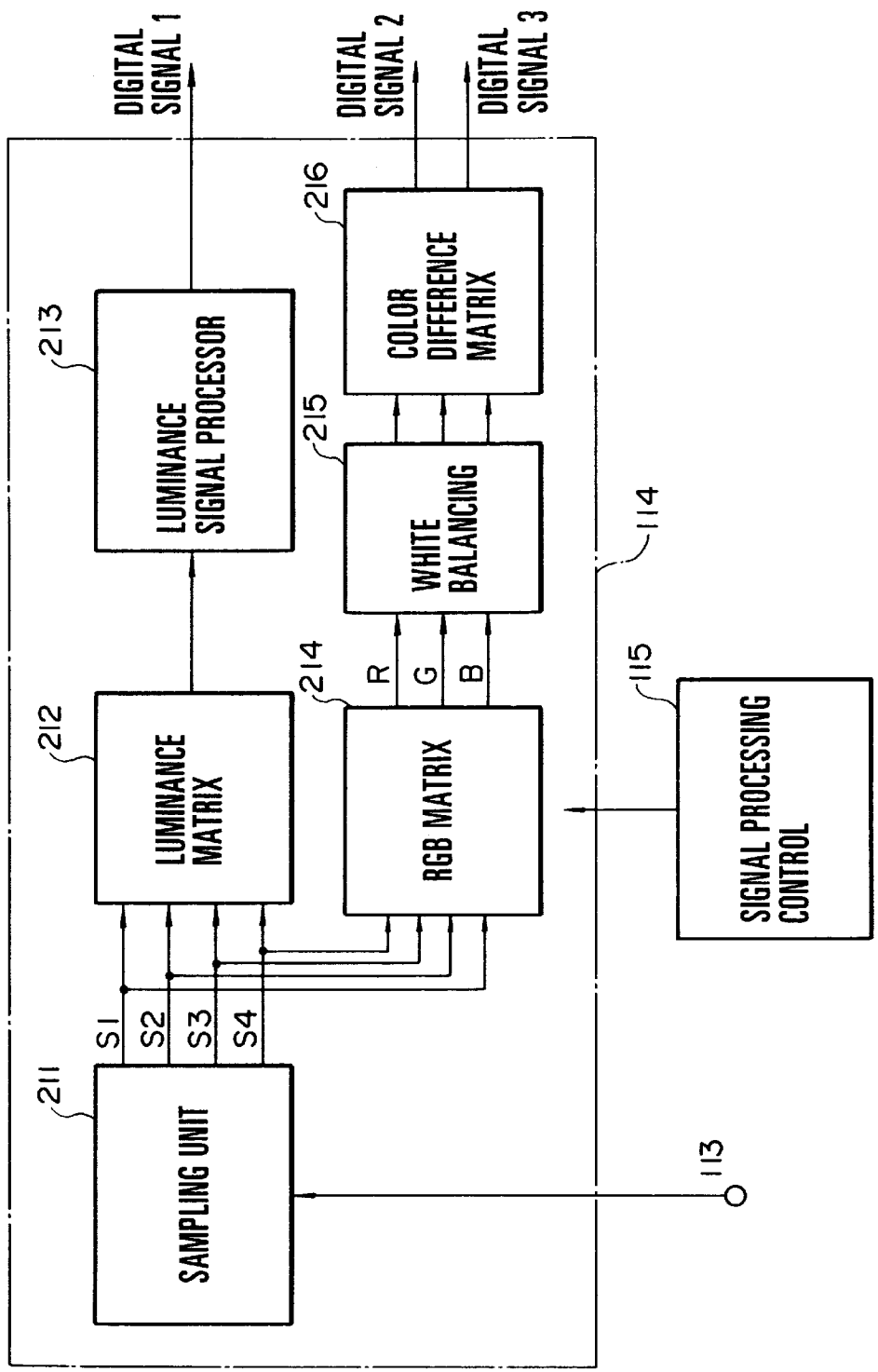

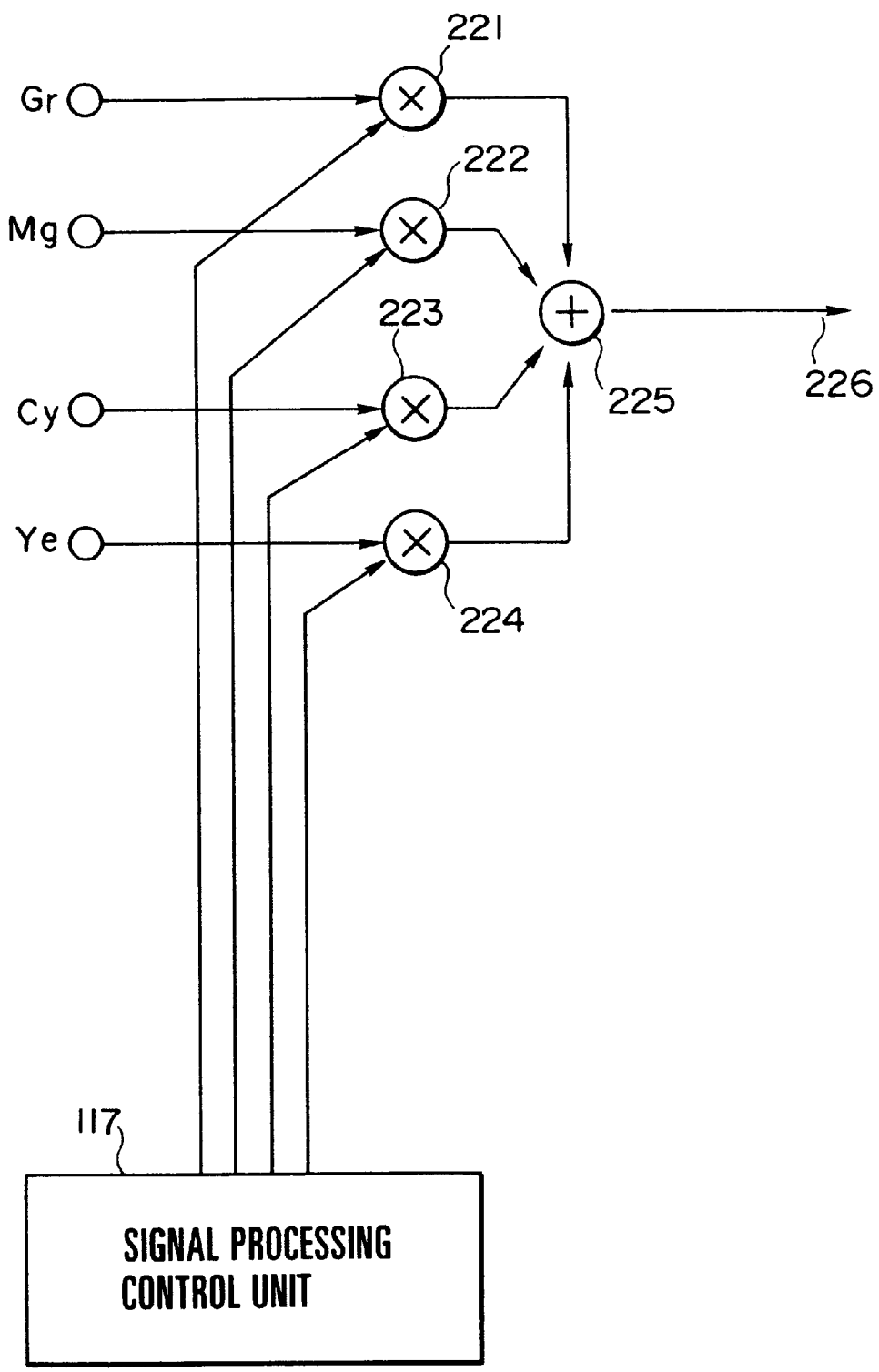

TIME ⟶

FIG. 8A $$Y = M1 \begin{pmatrix} Gr + Cy \\ Mg + Ye \\ Mg + Cy \\ Gr + Ye \end{pmatrix}$$

$$M1 = (M11 \quad M12 \quad M13 \quad M14)$$

FIG. 8B $$\begin{pmatrix} R \\ G \\ B \end{pmatrix} = M2 \begin{pmatrix} Gr + Cy \\ Mg + Ye \\ Mg + Cy \\ Gr + Ye \end{pmatrix}$$

$$M2 = \begin{pmatrix} M21 & M22 & M23 & M24 \\ M31 & M32 & M33 & M34 \\ M41 & M42 & M43 & M44 \end{pmatrix}$$

FIG. 8C $$\begin{pmatrix} R - Y \\ B - Y \end{pmatrix} = M3 \begin{pmatrix} R \\ G \\ B \end{pmatrix}$$

$$M3 = \begin{pmatrix} M51 & M52 & M53 \\ M61 & M62 & M63 \end{pmatrix}$$

TIME →

FIG.10A $$Y = M1 \begin{pmatrix} Gr \\ Mg \\ Cy \\ Ye \end{pmatrix}$$

FIG.10B $$\begin{pmatrix} R \\ G \\ B \end{pmatrix} = M4 \begin{pmatrix} Gr \\ Mg \\ Cy \\ Ye \end{pmatrix}$$

$$M4 = \begin{pmatrix} M71 & M72 & M73 & M74 \\ M81 & M82 & M83 & M84 \\ M91 & M92 & M93 & M94 \end{pmatrix}$$

FIG.10C $$\begin{pmatrix} R-Y \\ B-Y \end{pmatrix} = M2 \begin{pmatrix} R \\ G \\ B \end{pmatrix}$$

| G11  | Mg12 | G13  | Mg14 | G15  | Mg16 | → n1 |
|------|------|------|------|------|------|------|
| Cy21 | Ye22 | Cy23 | Ye24 | Cy25 | Ye26 | → n2 |
| Mg31 | G32  | Mg33 | G34  | Mg35 | G36  | → n3 |
| Cy41 | Ye42 | Cy43 | Ye44 | Cy45 | Ye46 | → n4 |
| G51  | Mg52 | G53  | Mg54 | G55  | Mg56 | → n5 |
| Cy61 | Ye62 | Cy63 | Ye64 | Cy65 | Ye66 | → n6 |

| G11 | Mg12 | G13 | Mg14 | G15 | Mg16 | →n1 |
|-----|------|-----|------|-----|------|-----|
| Cy21 | Ye22 | Cy23 | Ye24 | Cy25 | Ye26 | →n2 |
| Mg31 | G32 | Mg33 | G34 | Mg35 | G36 | →n3 |
| Cy41 | Ye42 | Cy43 | Ye44 | Cy45 | Ye46 | →n4 |
| G51 | Mg52 | G53 | Mg54 | G55 | Mg56 | →n5 |
| Cy61 | Ye62 | Cy63 | Ye64 | Cy65 | Ye66 | →n6 |
| Mg71 | G72 | Mg73 | G74 | Mg75 | G76 | →n7 |
| Cy81 | Ye82 | Cy83 | Ye84 | Cy85 | Ye86 | →n8 |

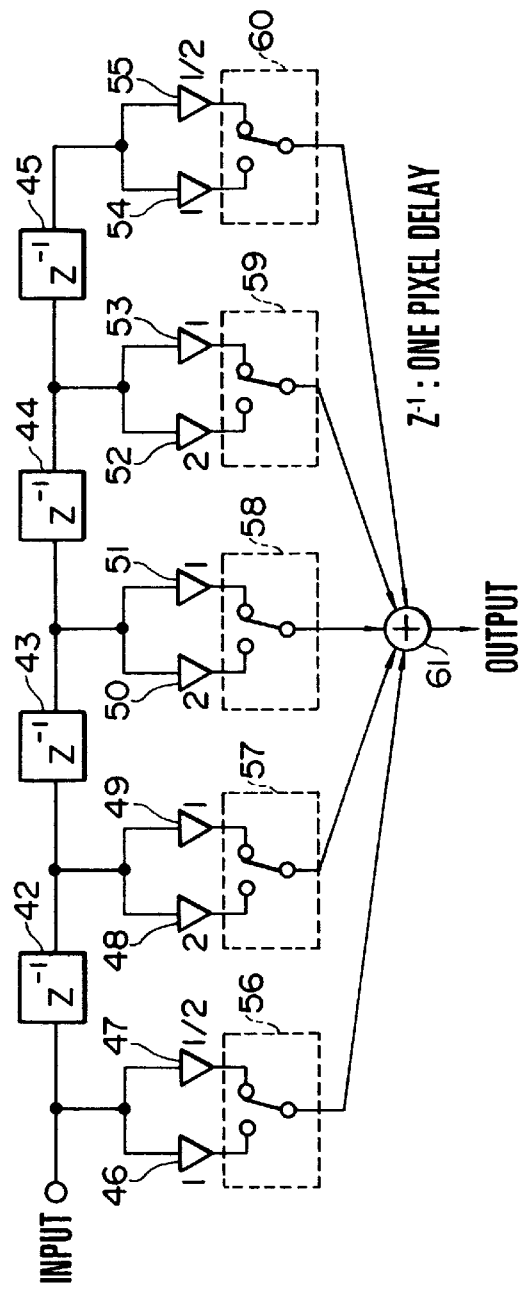
F I G. 22
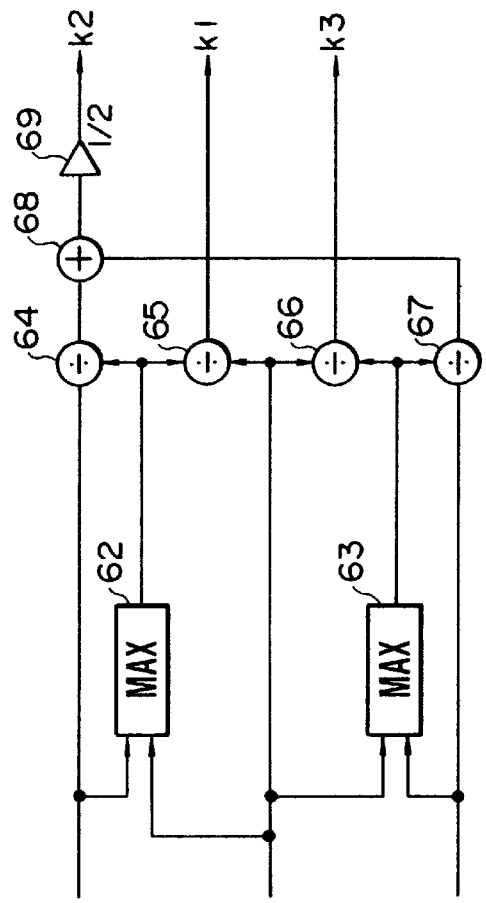
F I G. 23

○ : UNINTERPOLATED SIGNAL
△ : INTERPOLATED SIGNAL
Px : HORIZONTAL PIXEL PITCH
Py : VERTICAL PIXEL PITCH

①, ②, ③, ④ (○) : UNINTERPOLATED SIGNAL
①', ②', ③', ④' (△) : INTERPOLATED SIGNAL

① = Gr + Cy
② = Mg + Ye
③ = Mg + Cy
④ = Gr + Ye

Gr : gr-FILTER PIXEL SIGNAL
Mg : mg-FILTER PIXEL SIGNAL
Cy : cy-FILTER PIXEL SIGNAL
Ye : ye-FILTER PIXEL SIGNAL
Px : HORIZONTAL PIXEL PITCH
Py : VERTICAL PIXEL PITCH

① ′ = Gr + Cy
② ′ = Mg + Ye
③ ′ = Mg + Cy
④ ′ = Gr + Ye

Gr : gr-FILTER PIXEL SIGNAL
Mg : mg-FILTER PIXEL SIGNAL
Cy : cy-FILTER PIXEL SIGNAL
Ye : ye-FILTER PIXEL SIGNAL
N  : THE NUMBER OF HORIZONTAL PIXELS
M  : THE NUMBER OF VERTICAL PIXELS

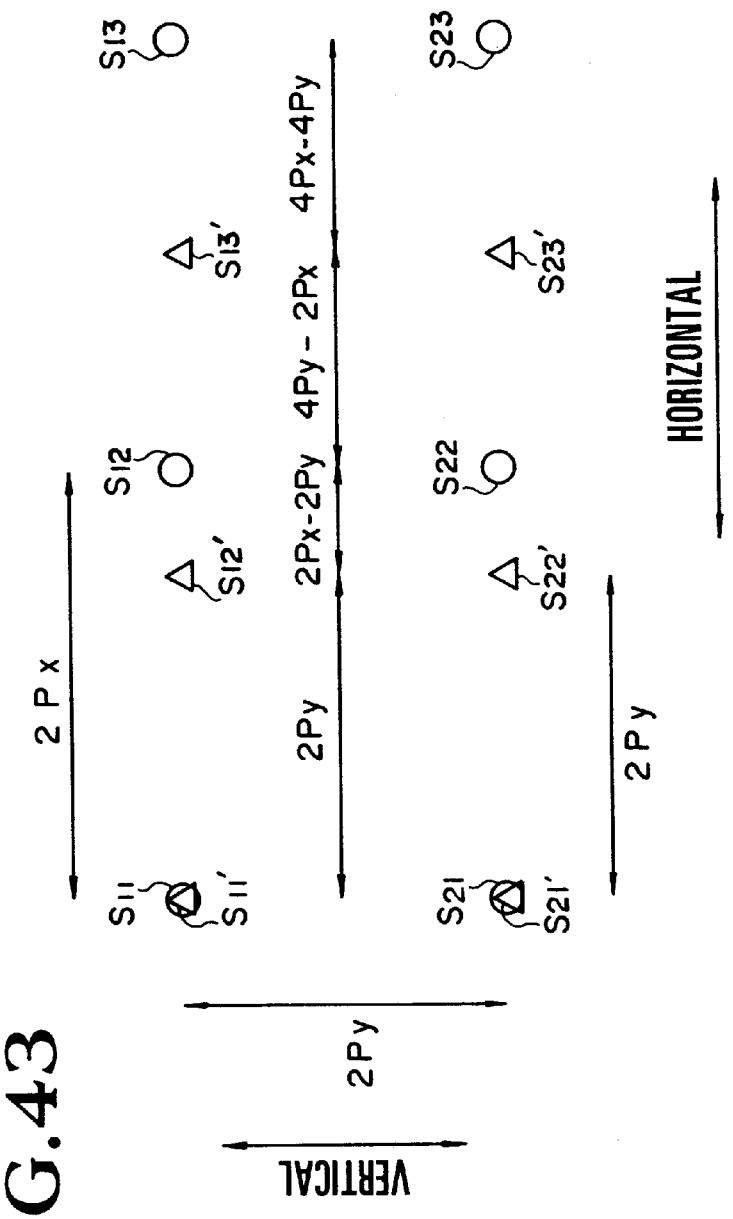

STILL PICTURE RECORDING DIGITAL CAMERA WITH OUTPUT UNIT HAVING DELAY UNIT AND MEMORY

CROSS REFERENCE TO RELATED APPLICATION

This is a divisional of U.S. application Ser. No. 08/921,569, filed Sep. 2, 1997, U.S. Pat. No. 5,990,946, which is a divisional of U.S. application Seri. No. 08/461,519, filed Jun. 5, 1995, now U.S. Pat. No. 5,726,707, which is a divisional of U.S. application Ser. No. 08/164,798, filed Dec. 10, 1993, now U.S. Pat. No. 5,512,945, the subject matter of which is incorporated by reference herein.

BACKGROUND OF THE INVENTION

The present invention relates to digital cameras and more particularly to a device for recording/ reproducing a still picture suitable for image inputting means for a computer, etc.

Since, in video cameras, various functions have been developed as the signal processing is performed in a digital manner and digital video signals are easily output, the cameras have been marked as video inputting means for computers. Though, a lower price image inputting means can be provided by utilizing parts of commercial based single-unit video camera-recorder as much as possible into a digital camera used as image inputting means, only special inputting means such as a line scanner has been provided at present.

In order to provide the low price video putting means, the following important problems must be solved:
1) The automatic control system should be applicable to a still picture—In a general video camera, exposure control and white balancing control are provided using a video signal. No sensors for illuminance and color temperature are provided as separate means. The illuminance and color temperature are sensed from the video signal and fed back to the controller. However, those data cannot be fed back to the still picture;
2) A still picture of the frame should be produced using a general image pickup unit—A general image pickup unit is of a destructive read type in which a pixel signal can be read only once and also of a pixel mixing type in which two pixels adjoining in the vertical direction are mixed and read out. Signal processing in this reading system produces no still picture having a resolution corresponding to the number of pixels;
3) A general-purpose image pickup unit should be applicable—After the video signal is input to a computer, an operation such as rotation can be performed on an image in graphics. In this case, no distortions should be invited in the image. To this end, a subject is required to be subjected to opto-electric conversion at spatial sampling pitches equal in the horizontal and vertical directions. To this end, an image pickup unit in which-pixels are disposed in a same distance in the horizontal and vertical directions is required to be used. However, in an image pickup unit used generally in a camera integral with a domestic VTR, the pixels are disposed at different intervals in the horizontal and vertical directions; and
4) The capacity of recording means which records a still picture should be minimized—In order to record a still picture with RGB signals which are a general video signal taken into a computer, addresses are required for the respective R, G and B signals to thereby increase the recording capacity.

SUMMARY OF THE INVENTION

In order to solve the problem 1), the result of the detection at the time of image pickup of the dynamic picture is stored and a still picture is produced on the basis of the result of the detection.

In order to solve the problem 2), the method of driving the image pickup unit is changed at the time of image pickup of the still picture to read a pixel signal without mixing same. When a video signal on the still picture is input to the signal processor, the contents of the signal processing are switched to those of the still picture.

Especially, in the still picture signal processing, the phase of sample and hold operation is inverted for each horizontal scan line for Mg and G signals where pixel arrangement is changed alternately for each line or coefficients for interpolation of pixels are changed for each horizontal scan line.

In order to solve the problem 3), a signal interpolator is provided which interpolates a video signal output from the image pickup means which includes a general image pickup unit where pixels are disposed at different intervals in the horizontal and vertical directions to produce a video signal having spatial sampling intervals equal in the horizontal and vertical directions.

In order to solve the problem 4), when the still picture is recorded on recording means, the video signal output from the image pickup unit should be stored without being subjected to luminance and color signal processing. Since image pickup means including a general image pickup unit outputs a so-called complementary video signal, the video signal output from the recording means is subjected to luminance and color signal processing.

BRIEF DESCRIPTION OF THE DRAWINGS

FIG. 2 is a schematic of an image pickup unit.

FIG. 3 shows a drive pulse and an output to and from the image pickup unit.

FIG. 4 shows a drive pulse and an output to and from the image pickup unit.

FIG. 5 is a schematic of a signal processor.

FIG. 6 shows a specified example of a matrix circuit.

FIGS. 8A, 8B, 8C show an specified example of signal processing in the image pickup of a dynamic picture.

FIGS. 10A, 10B, 10C show an specified example of signal processing in the image pickup of a still picture.

FIG. 22 shows one specified example of a reference signal generator.

FIG. 23 shows one specified example of a coefficient synthesis unit.

FIG. 43 illustrates a spatial distribution of signals in the embodiment of the present invention.

DESCRIPTION OF THE PREFERRED EMBODIMENTS

The present invention will be described below with respect to the drawings.

Figure 1:
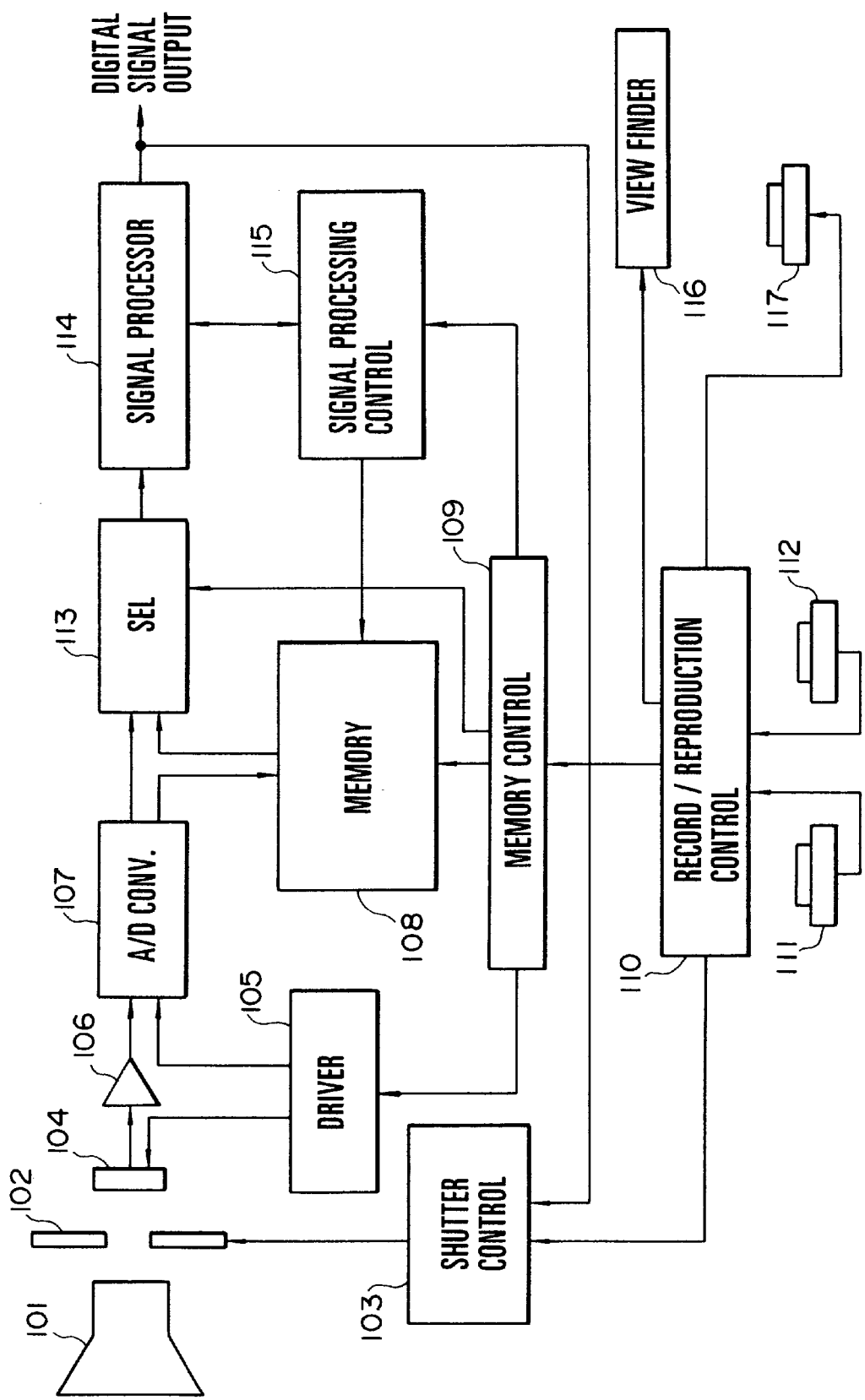
FIG. 1 is a block diagram of one embodiment of the present invention.

FIG. 1 is a schematic of a still picture recording digital camera as a first embodiment of the present invention. In FIG. 1, reference numeral 101 denotes a lens; 102, a shutter; 103, a shutter control unit; 104, an image pickup unit; 105, a driver; 106, an amplifier; 107, an A/D converter; 108, a memory; 109, a memory control unit; 110, a record/reproduction unit; 111, a shutter button; 112, a reproduction button; 113, a selector; 114, a signal processor; 115, a signal processing control unit; 116, a view finder; and 117, a full/economy selection switch. FIG. 2 shows a specified example of the image pickup unit 104. In FIG. 2, reference numeral 201 denotes photodiodes; 202, a vertical CCD; 203, a horizontal CCD; gr, mc, cy, and ye, green, magenta, cyan and yellow color filters, respectively, disposed on corresponding photodiodes. The photodiodes with such filters are generally called pixels. In this arrangement, the light entering the lens 101 passes to the image pickup unit 104 through the shutter 102 the stop value F of which is controlled by the shutter control unit 103. The light is then subjected to opto-electric conversion by the diode 201 of FIG. 2 disposed on a surface of the image pickup unit 104 into electric signal charges, which pass through the vertical CCD 202 to the horizontal CCD 203, and are subjected to voltage conversion synchronously with a horizontal scan pulse fed from the driver 105 and then output.

First, an image pickup operation of the camera will be described. As disclosed in published unexamined Japanese patent application JA-P-63-114487, entitled "Solid State Color Camera", the image pickup unit 104 mixes two pixel signals adjoining in the vertical direction and reads the result of the mixing, that is, reads the resulting signal in a so-called a pixel mixing system, which will be described next with respect to FIG. 3.

FIG. 3 is a timing chart indicative of vertical transfer pulse signals and transfer of signal charges in the vertical CCD 202 in the pixel mixture reading process. In FIG. 3, when a 3-value pulse of a vertical transfer pulse signal 1 becomes high, the gr and mg line photodiodes 201 transfer signal charges from gr- and mg-line photodiodes 201 to the vertical CCD 202, and the cy, ye line photodiodes 201 transfer signal charges to the vertical CCD 202. The signal charges transfers to the vertical CCD 202 are mixed in the vertical CCD 202, as shown in FIG. 3, and then transferred to the horizontal CCD 203.

The output signal from the image pickup unit 104 is amplified by the amplifier 106 and then input to the A/D converter 107, where the signal is sampled and converted to a digital signal in accordance with a timing pulse fed from the driver.

The signal resulting from the A/D converter 107 is input to the signal processor 114 by the selector 113. The signal processor 114 performs a general signal processing operation such as gamma-amendment and white balancing amendment to produce a luminance signal and color (R, G, B) signals.

The operation of recording a still picture will be described next.

In the above arrangement, when the shutter button 111 is depressed, a shutter close control signal is input from the record/reproduction control unit 112 to the shutter control unit 103. The shutter 102 is closed by the shutter control unit 103 a predetermined time after the shutter control unit 103 has received the shutter close control signal. The light entering the image pickup unit 104 by the time when the shutter 102 is closed is subjected to opto-electric conversion by the photodiodes 201 disposed in the image pickup unit 104. The signal then passes through the vertical CCD 202 to the horizontal CCD 203 while the shutter 102 is being closed, and is voltage-converted synchronously with a horizontal scan pulse fed from the driver 105 and output. At this time, if the image pickup unit 104 reads signal once from the photodiode 201, a so-called destructive reading would occur, and no signals would remain in the photodiodes 201.

Thus, if the pixel mixture reading is made like the dynamic picture reading, the information on the frame would be lost. In order to obtain a still picture without deteriorating the vertical-direction resolution, independent reading shown below will be made.

FIG. 4 is a timing chart indicative of a vertical transfer pulse in the independent reading and transfer of signal charges in the vertical CCD 202. In FIG. 4, the vertical transfer pulse 1 and the 3-value pulse of the vertical transfer pulse signal 3 become high at every other field, as shown in FIG. 4. Thus, in a field where the 3-value pulse of the vertical transfer pulse 1 becomes high, signal charges from only qr, Ma line photodiodes 201 are transferred to the vertical CCD 202. In the next one field, the 3-value pulse of the vertical transfer pulse signal 3 becomes high, so that only the cy, mg line photodiodes 201 transfer signal charges to the vertical CCD 202. The signal charges transferred to the vertical CCD 202 are all transferred to the horizontal CCD 203 in one field interval, so that the signal charges in the adjacent photodiodes 201 are not mixed as in the pixel mixing and reading system and one signal is obtained for each photodiode. The signal charges transferred to the horizontal CCD 203 are output from the image pickup unit 104 synchronously with a horizontal scan pulse fed from the driver 105.

Signals Gr, Mg, Cy and Ye read out independently by such operation from the respective pixels are converted by the A/D converter 107 to digital signals and recorded in the memory 108 which is controlled by the memory control unit 109. The memory 108 also records information on white balancing performed by the signal processor 114 when the image of the dynamic picture is picked up before the still picture is recorded. Information on the white balancing may be recorded in another recording means.

The operation of outputting a recorded still picture will be described below.

When the reproduction button 112 is depressed, the signal recorded in the memory 108 is selected by the selector 113 and input to the signal processor 114 in accordance with a control signal from the record/reproduction control unit. The signal processor 114 reads information on the white balancing to produce a predetermined video signal on the basis of that information. The view finder 116 displays the subject as well as the number of still pictures recordable in the memory 108 in accordance with a control signal from the record/reproduction control unit 110, and information on the full/economy and standby state to be described later in more detail.

The operation of the signal processor 114 will be described below. When the dynamic picture is taken, two-line pixel signals are mixed and read out from the image pickup unit 104 in the pixel mixing and reading system, as mentioned above, the read pixel signal is converted by the A/D converter 107 to a digital signal, and a signal shown in FIG. 3 is input to the signal processor 114. FIG. 5 shows a specified example of the signal processor 114 which produces a luminance signal and a color difference signal from the input signal. In FIG. 5, reference numeral 211 denotes a sampling unit which samples the input signal and produces output signals S1, S2, S3, S4; 212, a luminance matrix circuit which produces a luminance signal, using the illuminance matrix set by the signal processing control unit 115; 213, a luminance signal processor which performs a digital operation such as a well-known gammer-amendment on the luminance signal produced by the luminance matrix circuit 212; 214, a RGB matrix circuit which produces an RGB signal using the RGB matrix set by the signal processing control unit 115; 215, a white balancing unit; and 216, a color difference matrix circuit which produces a color difference signal, using a color difference signal matrix set by the signal processing control unit 115. FIG. 6 shows illustrative circuit structures of the luminance and RGB matrix circuits 212, 214; 221–224, multipliers which multiply the respective input signals by corresponding matrix coefficients; and 225, an adder which adds the outputs from the multipliers 221–224.

Figure 7A:
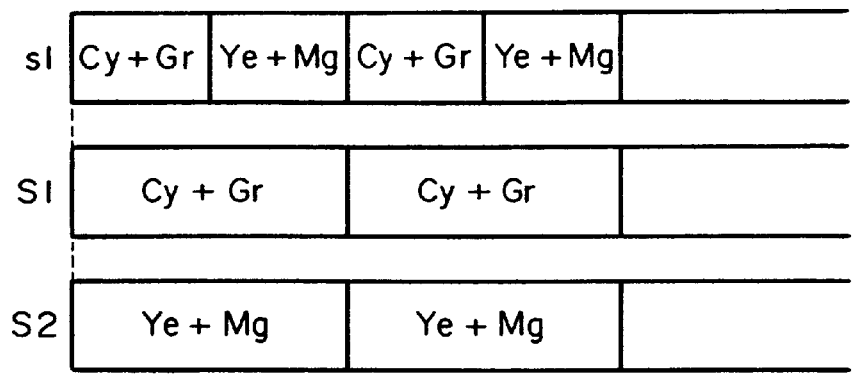
FIGS. 7A, 7B, 7C show an specified example of signal processing in the image pickup of a dynamic picture.
Figure 7B:
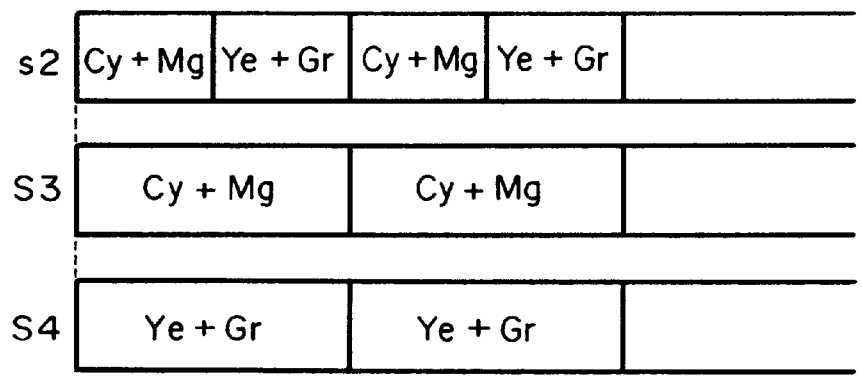
Figure 7C:
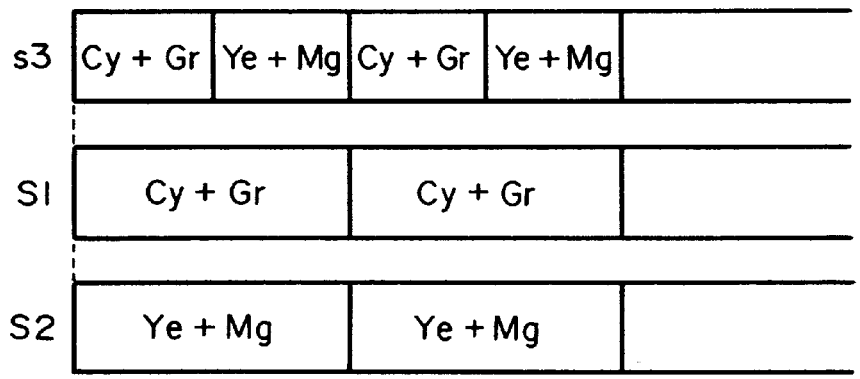

In FIG. 5, the sampling unit 211 samples and holds the sequentially signals s1, s1, . . . , of FIG. 3 and sequentially changing as shown in FIGS. 7A, 7B, 7C. FIG. 7A and 7C are timing charts indicative of horizontal intervals in which Cy+Gr or Ye+Mg signal is output from the image pickup unit 104. FIG. 7B is timing charts indicative of horizontal intervals in which Cy+Mg or Ye+Gr signal is output from the image pickup unit 104. The sampling unit 211 has a line memory (not shown), which outputs in a horizontal interval of FIG. 7B the same sequential signals S1, S2 as the signals output in the horizontal interval of FIG. 7A, and which outputs in a horizontal period of FIG. 7C the same sequential signals S3, S4 as the signals output in the horizontal period of FIG. 7B. The sampled and held signals Gr+Cy, Mg+Ye, Ma+Cy, Gr+Ye are multiplied by matrix coefficients M1, M2 of FIGS. 8A, 8B, 8C in the luminance matrix circuit 212 and RGB matrix circuit 214, respectively, into a luminance signal Y and RGB signals G, R, B. FIGS. 8A, 8B show the illustrated details of the matrix coefficients M1, M2 below:

$M_{11}=M_{12}=M_{13}=M_{14}=$ $M_{21}=-2, M_{22}=2, M_{23}=0, M_{24}=1$ $M_{31}=1, M_{32}=-1, M_{33}=0, M_{34}=2$ $M_{41}=1, M_{42}=0, M_{43}=2, M_{44}=-2$ (1)

The color difference signals R-Y, B-Y are produced similarly in the circuit configuration of FIG. 6. The matrix coefficient M3 of FIG. BC may have the illustrated details below:

$M_{51}=0.7, M_{52}=-0.59, M_{53}=-0.11$ $M_{61}=0.3, M_{62}=-0.59, M_{63}=0.89$ (2)

The matrix coefficients MN, M2, M3 are set by the signal processing control unit 115.

Generation of a signal indicative of a still picture will be described next.

Figure 9A:
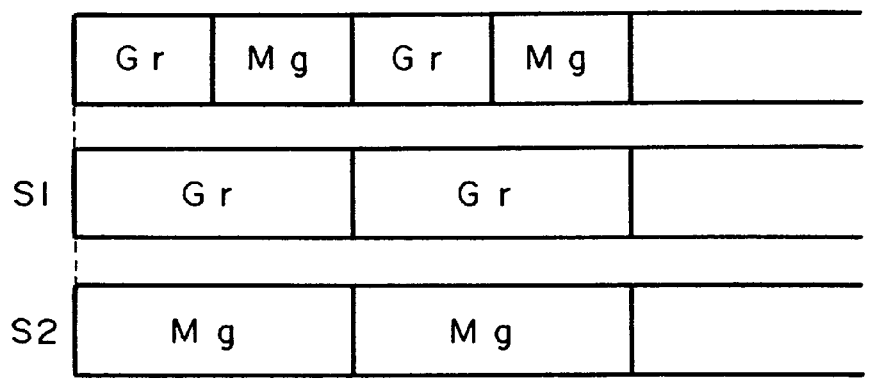
FIGS. 9A, 9B, 9C show an specified example of signal processing in the image pickup of a still picture.
Figure 9B:
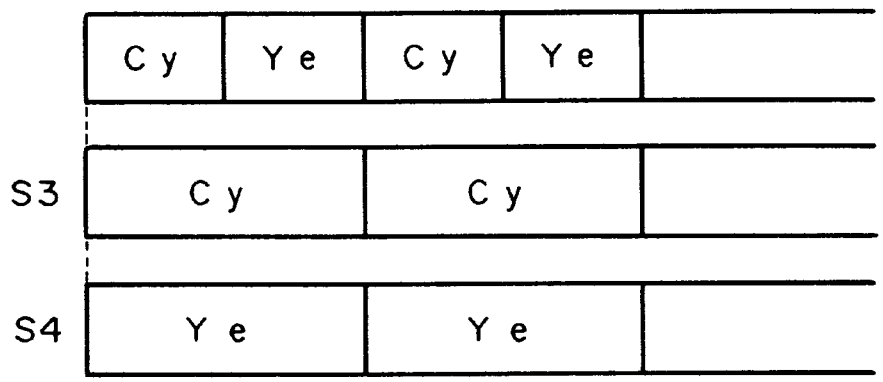
Figure 9C:
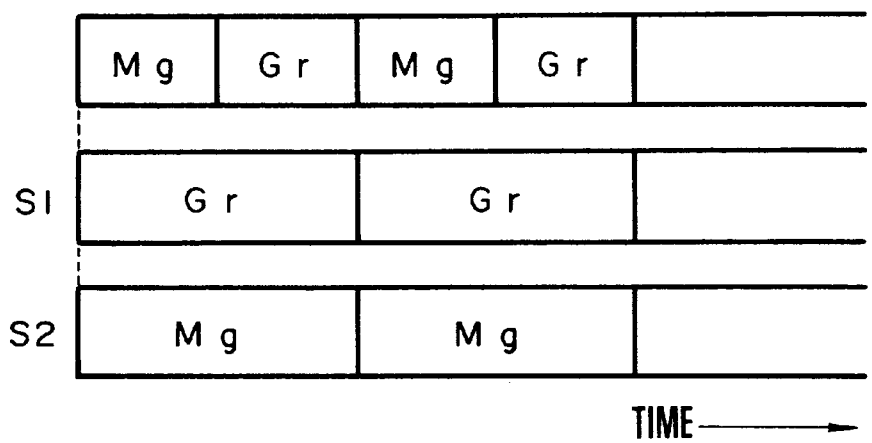

When the still picture is generated, the respective pixel signals are read independently from the image pickup unit 104, as mentioned above, the signals shown in FIG. 4 are then converted by the A/D converter 107 to digital signals, and the digital sequential signals are memorized in the memory 108. Signals are read from the first row photodiodes 201 and second row photodiodes 201 of FIG. 2 in this order of the memory 108 and input to the signal processor 114. As shown in FIGS. 9A, 9B, 9C, the sampling unit 211 samples and holds signals input in the time series of Gr, Mg, Gr, Mg, . . . or Cy, Ye, Cy, Ye, . . . , as in the dynamic picture pickup operation. The signal processing control unit 115 resets a matrix coefficient M at a matrix value M4 below thereby produce the luminance signal Y; color signals R, G, B; and color different signals R-Y, B-Y at the image pickup of the still picture shown in FIGS. 10A, 10B, 10C.

$M_{71}=0, M_{72}=1, M_{73}=-1, M_{74}=1$ $M_{81}=1, M_{82}=-1, M_{83}=1, M_{84}=1$ $M_{31}=1, M_{32}=-1, M_{33}=0, M_{34}=2$ $M_{91}=0, M_{92}=1, M_{93}=1, M_{94}=-1$ (3)

Figure 11A:
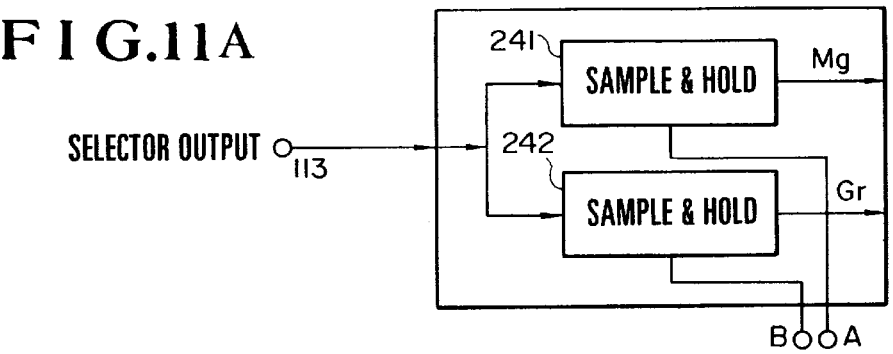
FIGS. 11A, 11B, 11C, 11D show a specified example of a sampling unit.
Figure 11B:
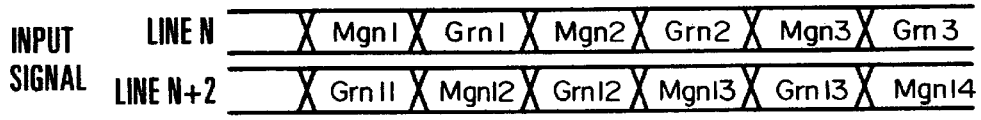
Figure 11C:
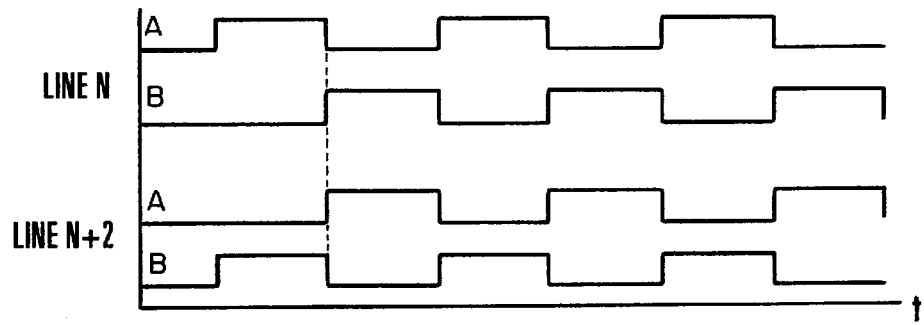

As shown in FIG. 2, the color filters gr, mg, are disposed repeatedly in the sequence of gr, mg, gr, . . . and in the sequence of mg, gr, m, gr, . . . . Thus, as shown in FIGS. 9A, 9C, the sequence of Gr, Mg input to the signal processor 114 deviates by one pixel. FIG. 11A shows a specified example of the sampling unit 211 which corrects that deviation. In FIG. 11A, reference numeral 241, 242 each denote a sample and hold unit; and A, B, sample and hold pulses for the sample and hold units 241, 242, respectively. As shown in FIG. 11B, if signals are input in the sequence of Mg, Gr, . . . in the line N signal processing where a signal on the Nth photodiode 201 is read out, sample and hold pulses A, B are fed as shown in FIG. 11C, and sampled and held in the time series shown in FIG. 11D. The sample and hold unit 241, 242 allow the input signals to pass therethrough when the sample and hold pulses are at high level and output the signal when the sample and hold pulses are at high level directly before the sampling and hold pulse is at low level. In the line N+2 signal processing where a signal on an N+2 the photodiode 201 is read out, the signals are input in the sequence of Gr, M, . . . . Thus, sample and hold pulses A, B are fed as in the line N+2 of FIG. 11C and sampled and held in the time series shown in the line N+2 of FIG. 11D.

Figure 12:
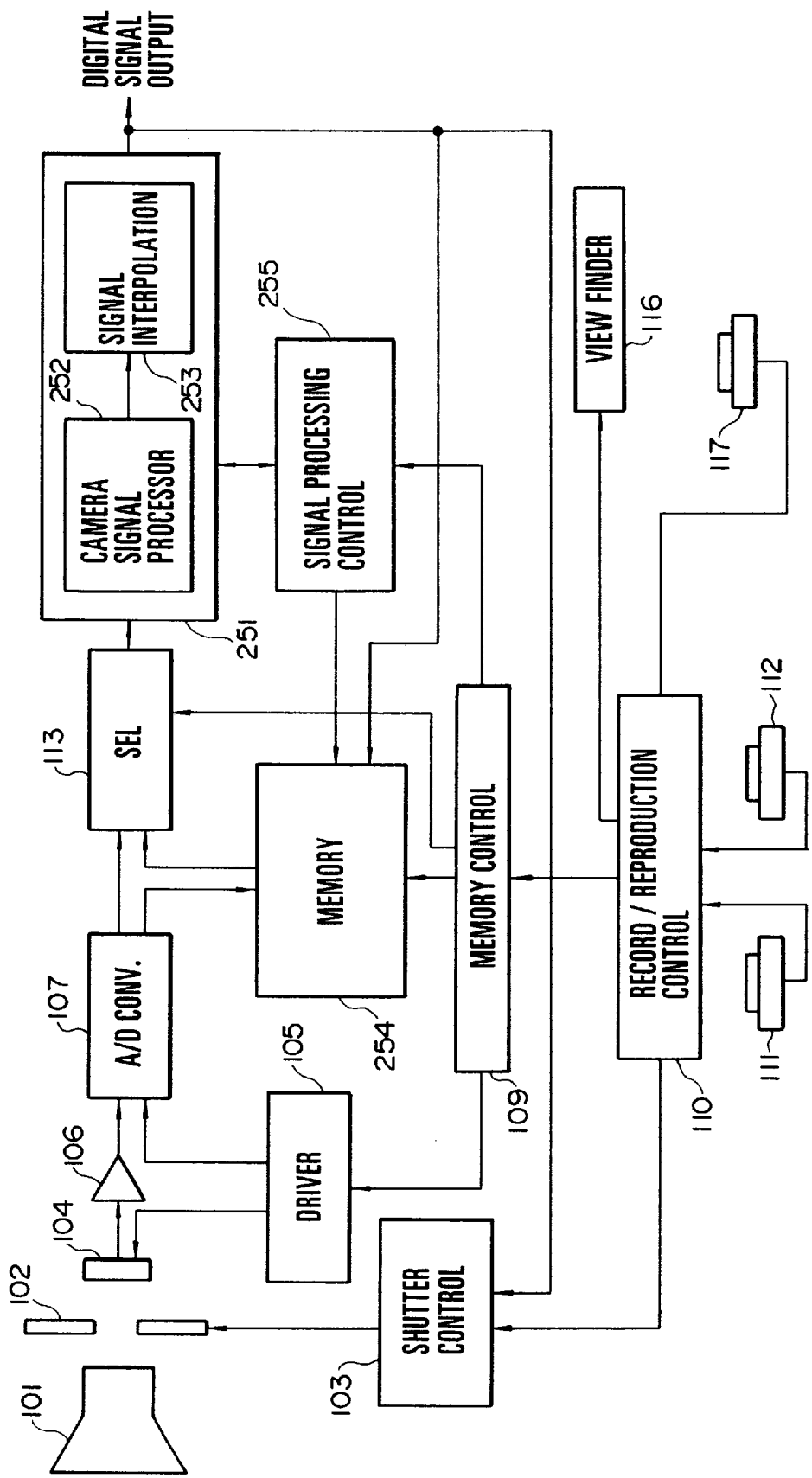
FIG. 12 is a block diagram of another embodiment of the present invention.

FIG. 12 shows another embodiment of the present invention. In FIG. 12, reference numeral 251 denotes a signal processor; 252, a camera signal processor; 253, a signal interpolator; 254, a memory; and 255, a signal processing control unit. The same reference numeral is used to denote the same element in the embodiments of FIGS. 12 and 1. The FIG. 12 embodiment is the same in structure as the FIG. 1 embodiment except that the output signal from the signal processor 251 is recorded in the memory 254 in the FIG. 12 embodiment. The operation of the dynamic picture image pickup is the same as in the embodiment of FIG. 1, and thus the operation of the still picture image pickup operation will be described next.

Figure 13A:
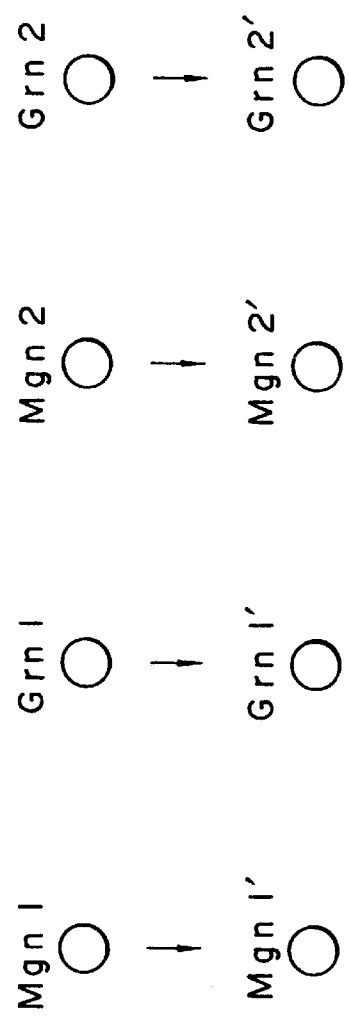
FIGS. 13A, 13B illustrate the embodiment of FIG. 12.

The signal output from the image pickup unit 104 in the independent reading operation is fed to a camera signal processor 252 including the signal processor of FIG. 5 and output unchanged through any one of the luminance signal and color difference signal generating passageways. For example, the sampling unit 211 outputs the input signal as it is to S1. The luminance matrix unit 212 adds a signal indicative of the product of the S1 and 1 and the signals indicative of S2–S4×0. The luminance signal processor 213 outputs the output signal as it is from the luminance matrix unit 212. The signal interpolator 253 performs a signal time-series conversion of FIGS. 13A, 13B in accordance with a control signal from the signal processing unit 255 and stores the resulting signals in the memory 254. FIGS. 13A, B show the spatial distributions of signals from the image pickup unit 104.

After the signal output from the image pickup unit 104 is recorded in the memory 254, the signal recorded in the memory 254 is input to the camera signal processor 252 where it is subjected to signal processing similar to that performed in the FIG. 1 embodiment in accordance with a control signal from the signal processing control unit 255 to produce a luminance signal Y and a color difference signals R-Y, B-Y. The signal interpolator 253 outputs the luminance signal and color difference signals R-Y, B-Y as they are in accordance with a control signal from the signal processing control unit 255.

Figure 11D:
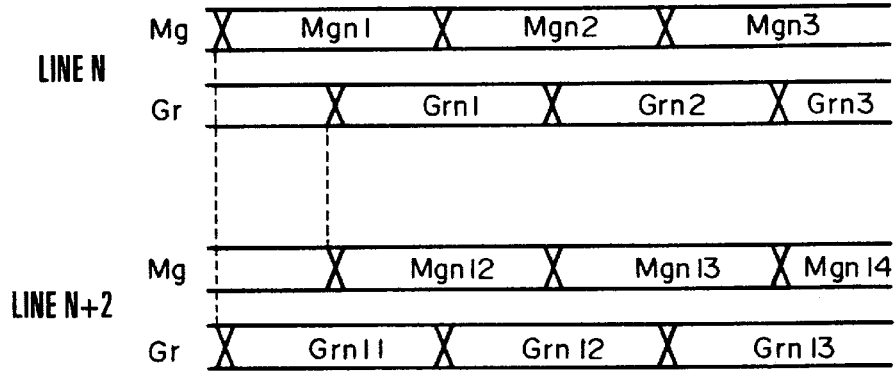
Figure 13B:
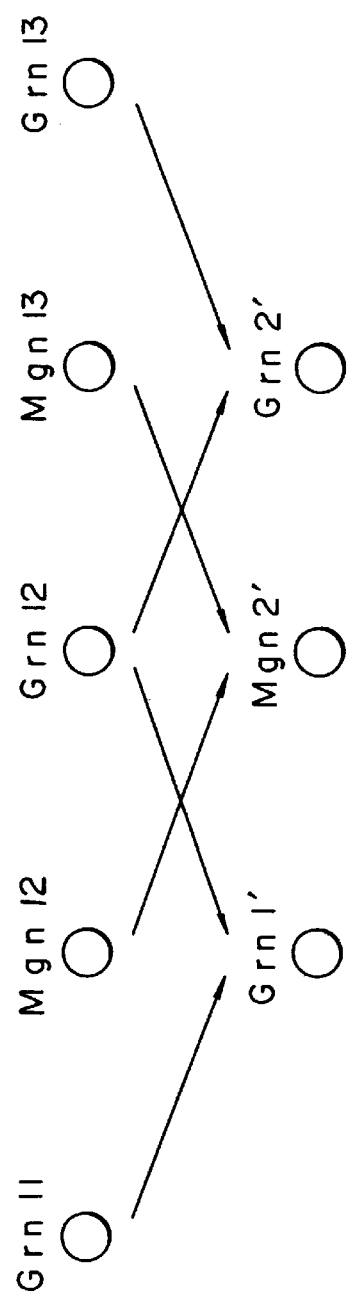
Figure 26:
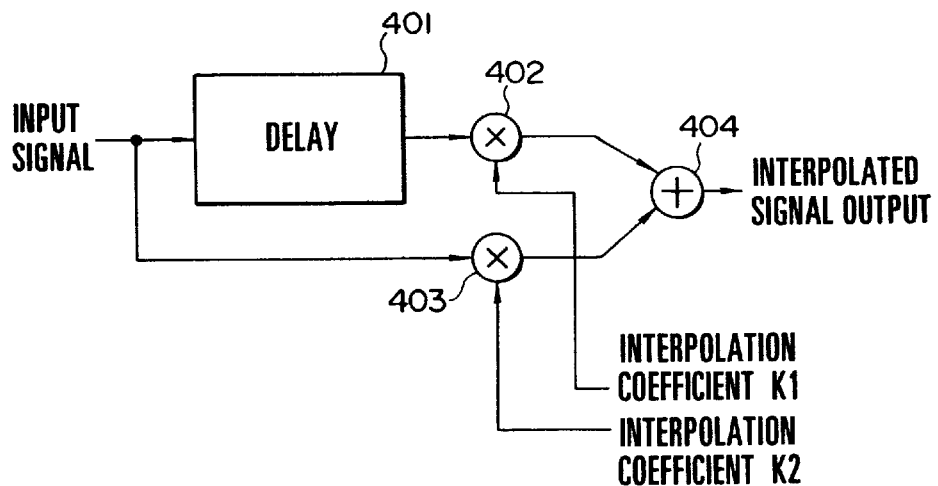
FIG. 26 illustrates an embodiment of the present invention of FIG. 31.

Signal interpolation of FIGS. 13A, 13B in the signal interpolator 253 eliminates the need for signal time-series conversion by the sampling in FIGS. 11B, 11C, 11D. When signals Mg, Gr are input in the time series shown in the line N of FIG. 11B to the signal interpolator 253, the signal interpolator 253 outputs those signals as interpolated signals Mg', Gr', as shown in FIG. 13A. When signals Gr, Mg are input in the time series shown in the line N+2 of FIG. 11B to the signal interpolator 253, the signal interpolator 253 produces at the position of the input Mg signal a signal Gr' interpolated from the two input Gr signals, and at the positron of the input Gr signal, a signal Mg' interpolated from the two input Mg signals as shown in FIG. 13B. FIG. 26 shows a specified example of the signal interpolator 253 which performs the above signal interpolation. In FIG. 26, reference numeral 401 denotes a delay unit; 402, 403, each a multiplier; 404, an adder; and K1, K2, coefficients fed from the signal processing control unit 255. The delay unit 401 delays the input signal thereto by two pixels, sets coefficients K1 and K2 at 0 and 1, respectively, at the time of the interpolation of FIG. 13 and sets coefficients K1 and K2 at 0.5, respectively, at the time of the interpolation of FIG. 13B.

Figure 14:
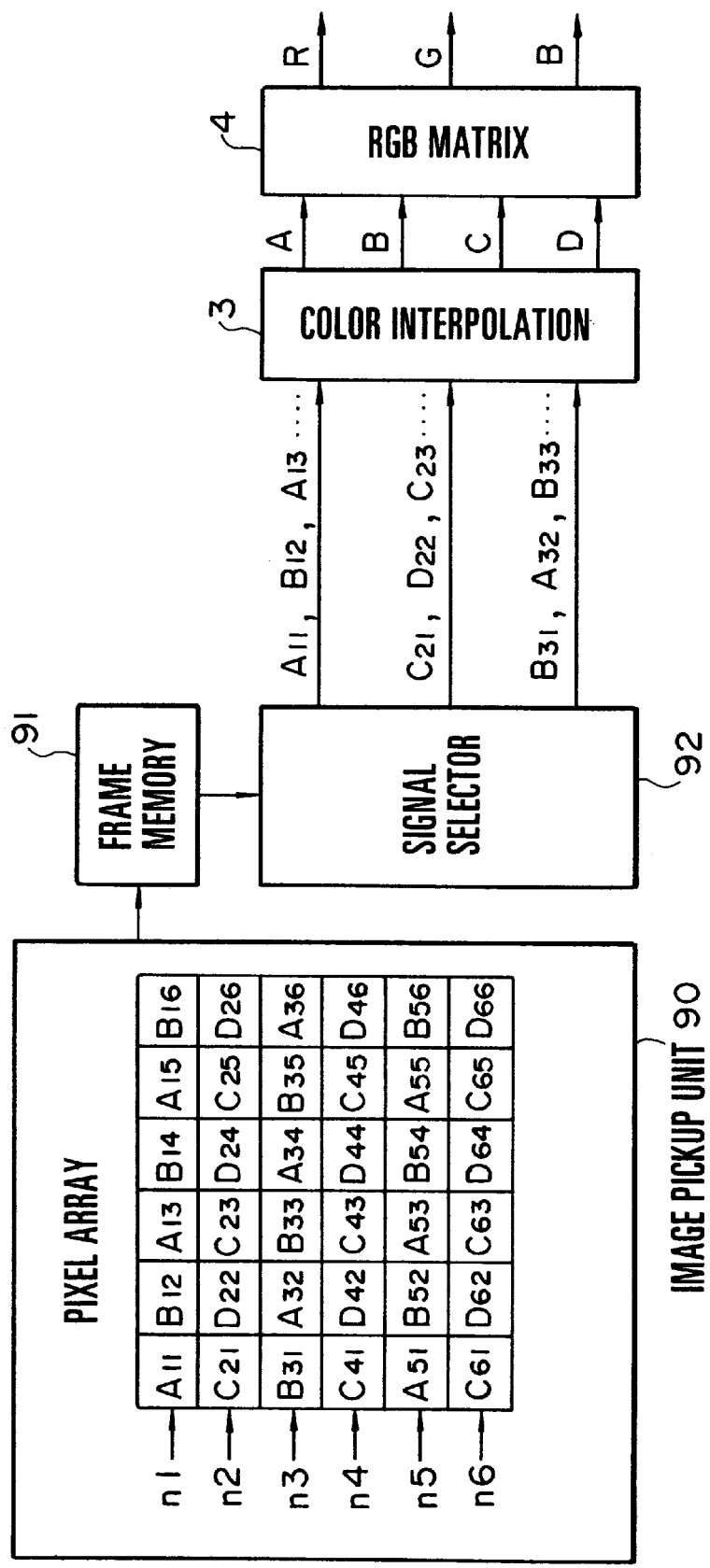
FIG. 14 is a block diagram of another embodiment of the present invention.

FIG. 14 is a block diagram of another embodiment of the present invention. Reference numeral 90 denotes an image pickup unit; 91, a frame memory; 92, a signal selector; 3, a color interpolator; and 4, an RGB matrix. As shown in FIG. 14, the image pickup unit 90 is composed of four pixels A, B, C and D (for convenience of description, each pixel signal has a number indicative of its position). A and B pixels are arranged alternately in each line so as to produce a color signal in the pixel mixing and reading operation. In the present embodiment, the pixel mixing and reading operation of the image pickup unit 90 is not performed, but the respective pixel signals as they are read into the frame memory 91. The signal selector 92 extracts signals in three adjacent vertical lines from the signals read into the frame memory 91 and feed them to the color interpolator 3, which interpolates respective color signals A, B, C, D from signals in the three vertical lines and outputs them as a RGB signal from the RGB matrix circuit 5.

As mentioned above, interpolation of the respective color signals by the color interpolator 3 will be described next. First, in the color signal interpolation in an n2 line, there are no A and B pixels, so that n1 and n3 line signals are used for interpolation in the vertical direction. In the n1 and n3 lines, the position of A and B pixels are different. Thus, interpolation coefficients are required to be changed in the horizontal direction. Assume now that one pixel of the interpolated color signal is produced from five horizontal pixels an uninterpolated signal. In this case, for example, the following expressions may be used to weight and interpolate the center of the horizontal pixels and interpolate the pixels: for example, $A=1/2(1/2A12+1/2A14)+1/2(1/4A31+1/2A33+1/4A35)$ $B=1/2(1/4B11+1/2B13+1/4B15)+1/2(1/2B32+1/2B34)$ Since C and D are present in the n2 line, the center of the C and D pixels are weighted in the horizontal direction alone and then interpolated: that is, $C=1/2(1/2C21+C23+1/2C25)$ $D=1/2(D22+D24)$ In the generation of a color signal in one horizontal scan interval in the line n3, there are no C and D pixels, the n2 an n4 lines are used for interpolation and the A and B pixels are interpolated from the n3 line: that is, $$A=1/2(1/2A31+A33+1/2A35)$$

$$B=1/2(B32+B34)$$

$$C=1/2(1/4C21+1/2C23+1/4C25)+1/2(1/4C41+1/2C43+1/4C45)$$

$$D=1/2(1/2D22+1/2D24)+1/2(1/2D42+1/2D44)$$

Considering that the arrangement of A and B pixels is alternately replaced with each other from line to line:
In the n4 line;

$$A=1/2(1/4A31+1/2A33+1/4A35)+1/2(1/2A52+1/2A54)$$

$$B=1/2(1/2B32+1/2B34)+1/2(1/4B51+1/2B53+1/2B55)$$

$$C=1/2(1/2C41+C43+1/2C45)$$

$$D=1/2(D42+D44)$$

In the n5 line;

$$A=1/2(A52+A54)$$

$$B=1/2(1/2B51+B53+1/2B55)$$

$$C=1/2(1/4C41+1/2C43+1/4C45)+1/2(1/4C61+1/2C63+1/4C65)$$

$$D=1/2(1/2D42+1/2D44)+1/2(1/2D62+1/2D64)$$

Thus, the color signal is produced by sequential repetition of the interpolation coefficients in the n2, n3, n4 and n5 lines.

As described above, according to the present embodiment, the color signal is interpolated and produced from three vertical lines so that a digital camera is realized where a deterioration in the vertical resolution of the color signal is reduced. While in the present embodiment four color signals are described as A, B, C and D, which, for example, are generally Mg, G, Cy, Ye, the colors are not necessarily designated as long as a normal color is reproduced. The interpolation coefficient is shown for illustrative purposes. As long as a color signal is interpolated and produced from three vertical lines, the present particular coefficients are not especially adhered to.

Figures 15, 16:
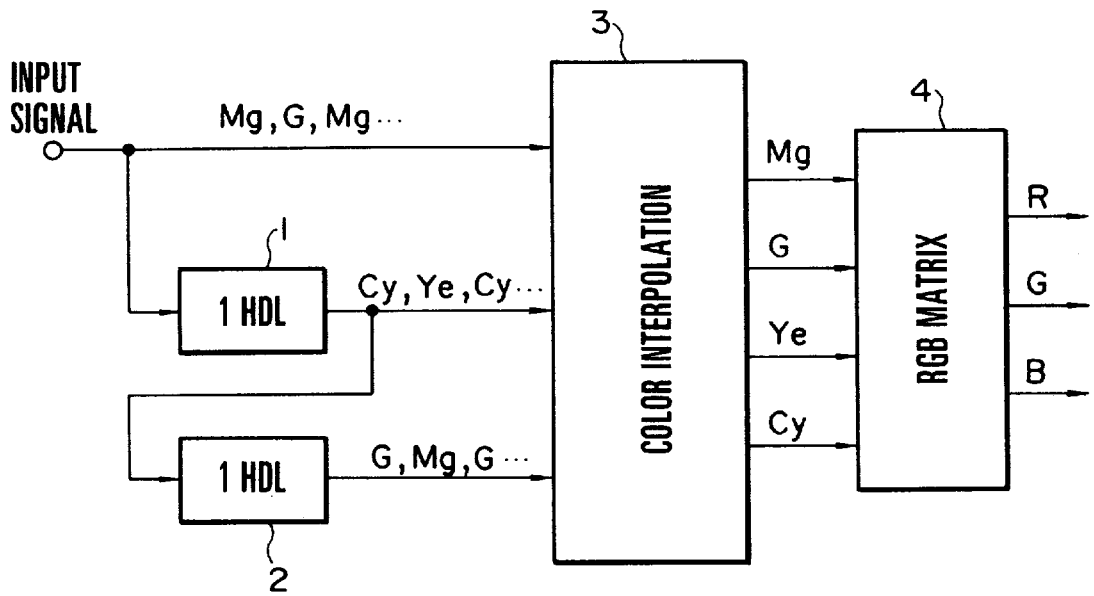
FIG. 15 is a block diagram of another embodiment of the present invention.
FIG. 16 illustrates an interpolating method of generating the respective complementary colors.

FIG. 15 is a block diagram of an embodiment of the present invention which is the same as the embodiment of FIG. 14 except that a signal selector 92 is composed of 1 H (one horizontal scanning period) delay unit. The same reference numeral is used to denote to an element having the same function and performing the same operation in the embodiments of FIGS. 15 and 14 and further description thereof will be omitted.

When the image pickup unit has an pixel arrangement of FIG. 16, a signal depending on the pixel arrangement of the image pickup unit read out from the memory is fed to a color interpolator 3 along with a 1 H and a 2 H delayed signal delayed by one horizontal scanning period by 1 H delay units 2 and 3, which interpolate and produce Mg, G, Ye, Cy complementary colors, and the R, G, B matrix circuit 4 output R, G, and B signals on the basis of those colors, in FIG. 15. Assume in the present embodiment that a color signal is interpolated and produced as in the FIG. 14 embodiment. In that case, Mg, G, Ye and Cy are given as follows:
In an n2 line;

$$Mg=1/2(1/2Mg12+1/2Mg14)+1/2(1/4Mg31+1/2Mg33+1/4Mg35)$$

$$G=1/2(1/4G11+1/2G13+1/4G15)+1/2(1/2G32+1/2G34)$$

$$Ye=1/2(1/2Ye22+Ye24)$$

$$Cy=1/2(1/2Cy21+Cy23+1/2Cy25),$$

In an n3 line;

$$Mg=1/2(1/2Mg31+Mg33+1/2Mg35)$$

$$G=1/2(G32+G34)$$

$$Ye=1/2(1/2Ye22+1/2Ye24)+1/2(1/2Ye42+1/2Ye44)$$

$$Cy=1/2(1/4Cy21+1/2Cy23+1/4Cy25)+1/2(1/4Cy41+1/2Cy43+1/4Cy45),$$

In an n4 line;

$$Mg=1/2(1/4Mg31+1/2Mg33+1/4Mg35)+1/2(1/2Mg52+1/2Mg54)$$

$$G=1/2(1/2G32+1/2G34)+1/2(1/4G51+1/2G53+1/4G55)$$

$$Ye=1/2(Ye42+Ye44)$$

$$Cy=1/2(1/2Cy41+Cy43+1/2Cy45),$$

In an n5 line;

$$Mg=1/2(Mg52+Mg54)$$

$$G=1/2(1/2G51+G53+1/2G55)$$

$$Ye=1/2(1/2Ye42+1/2Ye44)+1/2(1/2Ye62+1/2Ye64)$$

$$Cy=1/2(1/4Cy41+1/2Cy43+1/4Cy45)+1/2(1/4Cy61+1/2Cy63+1/4Cy65).$$

The color signal is then produced by sequentially repeating the interpolation coefficients in the lines n2, n3, n4 and n5 as in the FIG. 14 embodiment.

Figure 17:
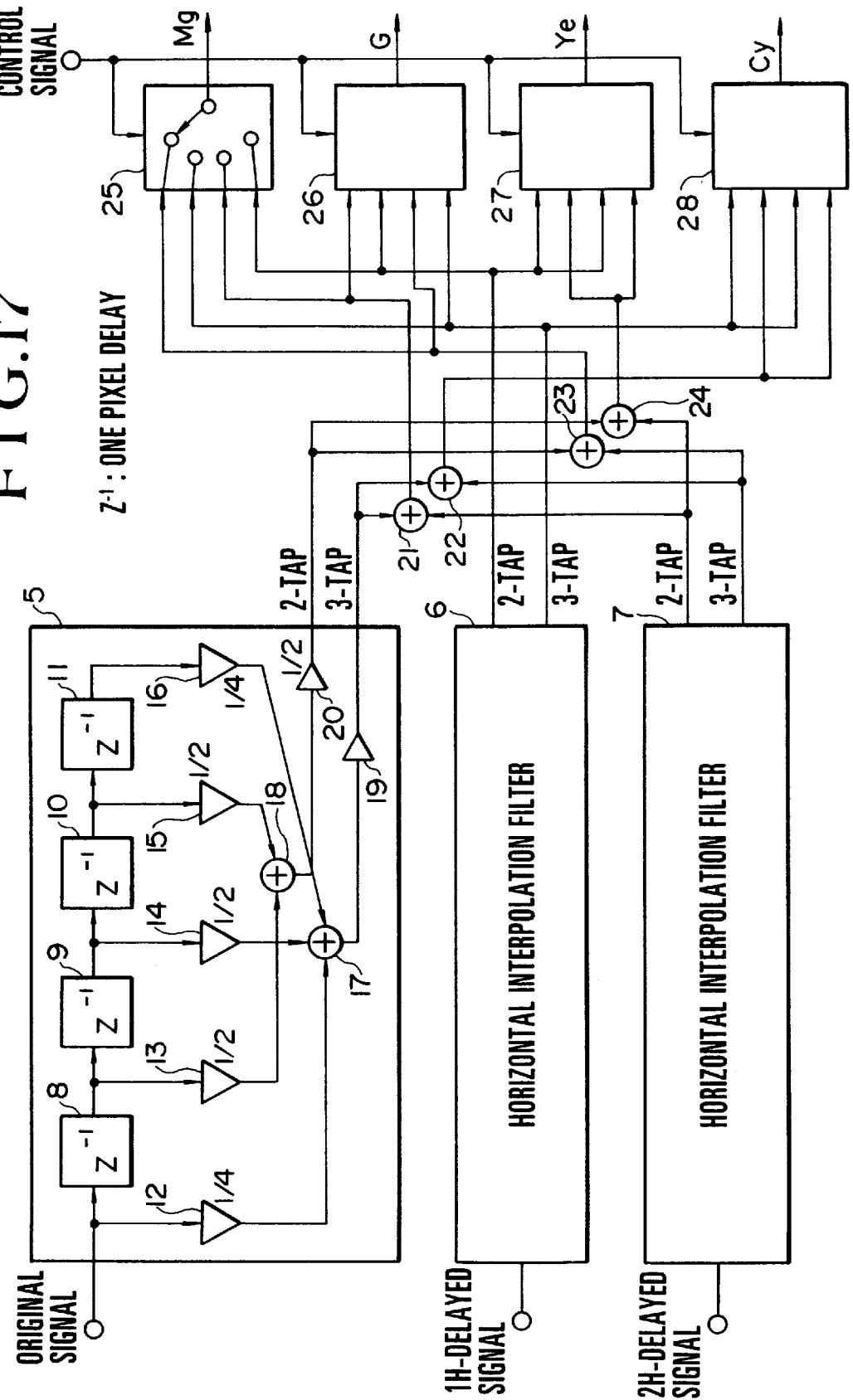
FIG. 17 shows one specified example of a color interpolator.

A specified example of the interpolator 3 will be described next with respect to FIG. 17. Reference numerals 5–7 each denote an interpolator filter; 21–24 each, an adder; and 25–28 each, a switching unit. The interpolator filters 5–7 each are composed of 1 H pixel delay units 8–11, coefficient setting units 12–16, 19, 20 and adders 17, 18 so as to output a 2- and a 3-tap processed signal. The original signal read out from the memory, 1 H- and 2 H-delayed signals are fed to the horizontal interpolator filters 5 and 6. Filtered original signal and 2 H-delayed signal are added by the adders 21–24 to the 2- and 3-tap outputs, respectively, and the resulting signals are input to the switching units 25–28 while the filtered 1 H-delayed signal is directly input to the switch units 25–28. Respective complementary colors which satisfy the above interpolation expressions will be output by feeding a control signal which sequentially switches the switching circuits 25–28 at intervals of 1 H in a 4 H period.

While the specified example of the color interpolator is realized by combined one-dimensional filters, the arrangement is not limited to the specified one as long as the interpolation expressions are satisfied. For example, the interpolator may be realized by two-dimensional filters.

While in the embodiment interpolation has been described as using 5 horizontal pixels, the respective complementary colors may be interpolated and produced depending on a required signal band, for example, of 3 or 7 pixels, of course.

As described above, according to the present embodiment, R, G and B signals are produced from three vertical lines as in the FIG. 14 embodiment, so that a digital camera is provided in which a deterioration in the vertical resolution of the color signal is reduced.

Figure 18:
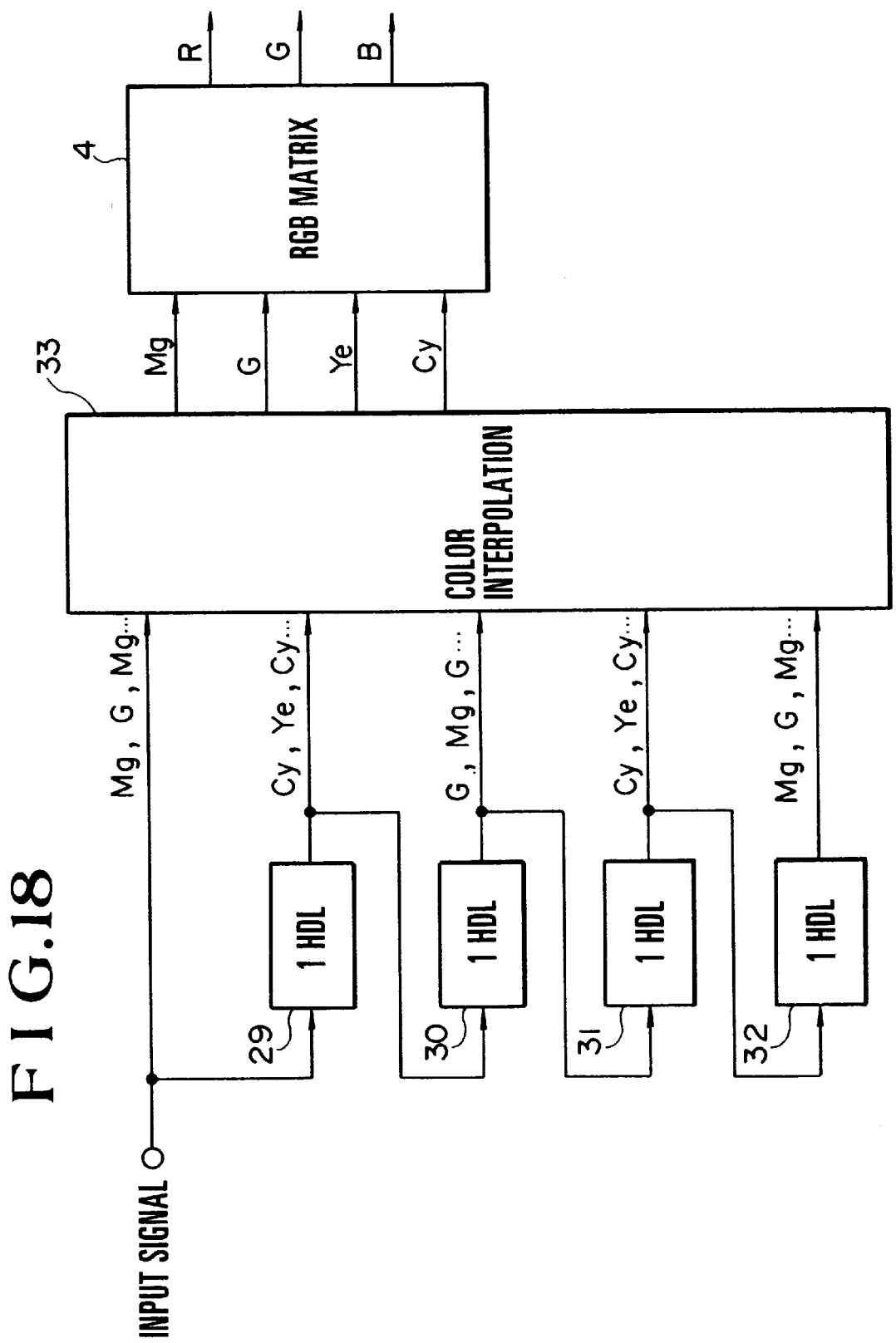
FIG. 18 is a block diagram of another embodiment of the present invention.

FIG. 18 is a block diagram of a further embodiment of the present invention, which is the same in structure as the FIG. 14 embodiment except that the respective complementary colors are interpolated and produced from five vertical lines. The same reference numeral or character is used to denote an element having the same function and performing the same operation as the corresponding one of the embodiments of FIGS. 18 and 14 and further description thereof will be omitted.

In FIG. 18, a color interpolator 33 receives the original signal, 1 H-, 2 H-, 3 H- and 4 H-delayed signals delayed by 1 H delay units 29–32 and produces complementary colors Mg, G, Ye, Cy. This operation will be described next with respect to FIG. 18.

Figures 19, 20:
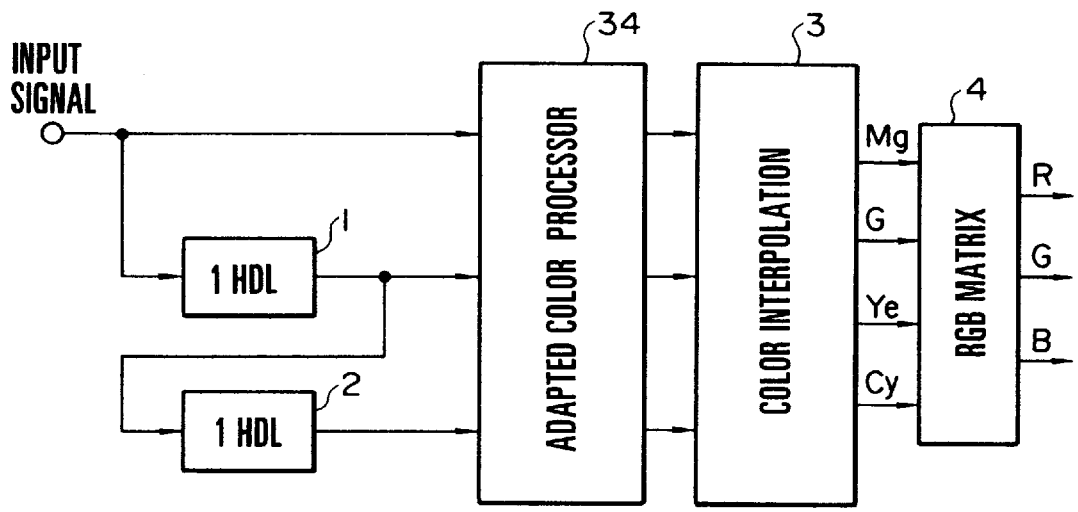
FIG. 19 illustrates an interpolating method of producing the respective complementary colors from 5 vertical lines.
FIG. 20 is a block diagram of another embodiment of the present invention.

FIG. 19 shows respective pixel signals arranged on the arranged pixels of the image pickup unit and given the respective numbers. Production of one horizontal scan interval signal from five vertical lines and five horizontal pixels will be described. Since no Cy and Ye pixel signals are present in the production of a color signal of one horizontal scan interval in a line n3, the Cy, Ye pixel signals are interpolated from lines n2 and n4. The Mg and G are obtained by mainly weighing signals in the n3 line and by interpolation from n1 and n5 lines. Thus, $$Mg = 1/4(1/2Mg12 + 1/2Mg14) +$$
$$\quad 1/2(1/4Mg31 + 1/2Mg33 + 1/4Mg35) +$$
$$\quad 1/4(1/2Mg52 + 1/2Mg54)$$
$$G = 1/4(1/4G11 + 1/2G13 + 1/4G15) +$$
$$\quad 1/2(1/2G32 + 1/2G34) +$$
$$\quad 1/4(1/4G51 + 1/2G53 + 1/4G55)$$
$$Ye = 1/2(1/2Ye22 + 1/2Ye24) +$$
$$\quad 1/2(1/2Ye42 + 1/2Ye44)$$
$$Cy = 1/2(1/4Cy21 + 1/2Cy23 + 1/4Cy25) +$$
$$\quad 1/2(1/4Cy41 + 1/2Cy43 + 1/4Cy45)$$

In the n4 line, Mg and G signals are interpolated from lines n3 and n5 while Cy and Ye signals are weighted mainly in the n4 line and interpolated from lines n and n6. Thus, $$Mg = 1/2(1/4Mg31 + 1/2Mg33 + 1/4Mg35) +$$
$$\quad 1/2(1/2Mg52 + 1/2Mg54)$$
$$G = 1/2(1/2G32 + 1/2G34) +$$
$$\quad 1/2(1/4G51 + 1/2G53 + 1/4G55)$$
$$Ye = 1/4(1/2Ye22 + 1/2Ye24) +$$
$$\quad 1/2(1/2Ye42 + 1/2Ye44) +$$
$$\quad 1/4(1/2Ye62 + 1/2Ye64)$$
$$Cy = 1/4(1/4Cy21 + 1/2Cy23 + 1/4Cy25) +$$
$$\quad 1/2(1/4Cy41 + 1/2Cy43 + 1/4Cy45) +$$
$$\quad 1/4(1/4Cy61 + 1/2Cy63 + 1/4Cy65)$$

Considering the arrangement of Mg and G pixels is replaced with each other for each line as in the FIG. 14 embodiment, Mg, G, Ye and Cy are given as follows:

In the n5 line;

$$Mg = 1/4(1/4Mg31 + 1/2Mg33 + 1/4Mg35) +$$
$$\quad 1/2(1/2Mg52 + 1/2Mg54) +$$
$$\quad 1/4(1/4Mg71 + 1/2Mg73 + 1/4Mg75)$$
$$G = 1/4(1/2G32 + 1/2G34) +$$
$$\quad 1/2(1/4G51 + 1/2G53 + 1/4G55) +$$
$$\quad 1/4(1/2G72 + 1/2G74)$$
$$Ye = 1/2(1/2Ye42 + 1/2Ye44) +$$
$$\quad 1/2(1/2Ye62 + 1/2Ye64)$$
$$Cy = 1/2(1/4Cy41 + 1/2Cy43 + 1/4Cy45) +$$
$$\quad 1/2(1/4Cy61 + 1/2Cy63 + 1/4Cy65),$$

In the n6 line;

$$Mg = 1/2(1/2Mg52 + 1/2Mg54) +$$
$$\quad 1/2(1/4Mg71 + 1/2Mg73 + 1/4Mg75)$$
$$G = 1/2(1/4G51 + 1/2G53 + 1/4G55) +$$
$$\quad 1/2(1/2G72 + 1/2G74)$$
$$Ye = 1/4(1/2Ye42 + 1/2Ye44) +$$
$$\quad 1/2(1/2Ye62 + 1/2Ye64) +$$
$$\quad 1/4(1/2Ye82 + 1/2Ye84)$$
$$Cy = 1/4(1/4Cy41 + 1/2Cy43 + 1/4Cy45) +$$
$$\quad 1/2(1/4Cy61 + 1/2Cy63 + 1/4Cy65) +$$
$$\quad 1/4(1/4Cy81 + 1/2Cy83 + 1/4Cy85)$$

As described above, color signals are produced sequentially by switching the interpolation coefficients for every four lines as in the FIG. 14 embodiment.

The interpolation coefficients in the above expressions are illustrative of coefficients for interpolating and producing color signals from five vertical lines and are not limited to the illustrated ones in the present invention.

As described above, according to the present invention, the respective complementary colors are weighted, interpolated and produced from the five vertical lines, so that the filter characteristics in the vertical direction are 2- and 3-tap characteristics as in the filter characteristic in the horizontal direction. Therefore, a signal processor is realized in which interpolation characteristics in the horizontal and vertical directions are equal.

FIG. 20 is a block diagram of a further embodiment of the present invention which is the same in structure as the first embodiment except that an adaptive color processor is provided to reduce a color moiré on a vertical edge. The same reference numeral or character is used to denote an element having the same function and performing the same operation as the corresponding element in the present and fifth embodiments of FIGS. 20 and 1. Further description of such element will be omitted.

Figure 21:
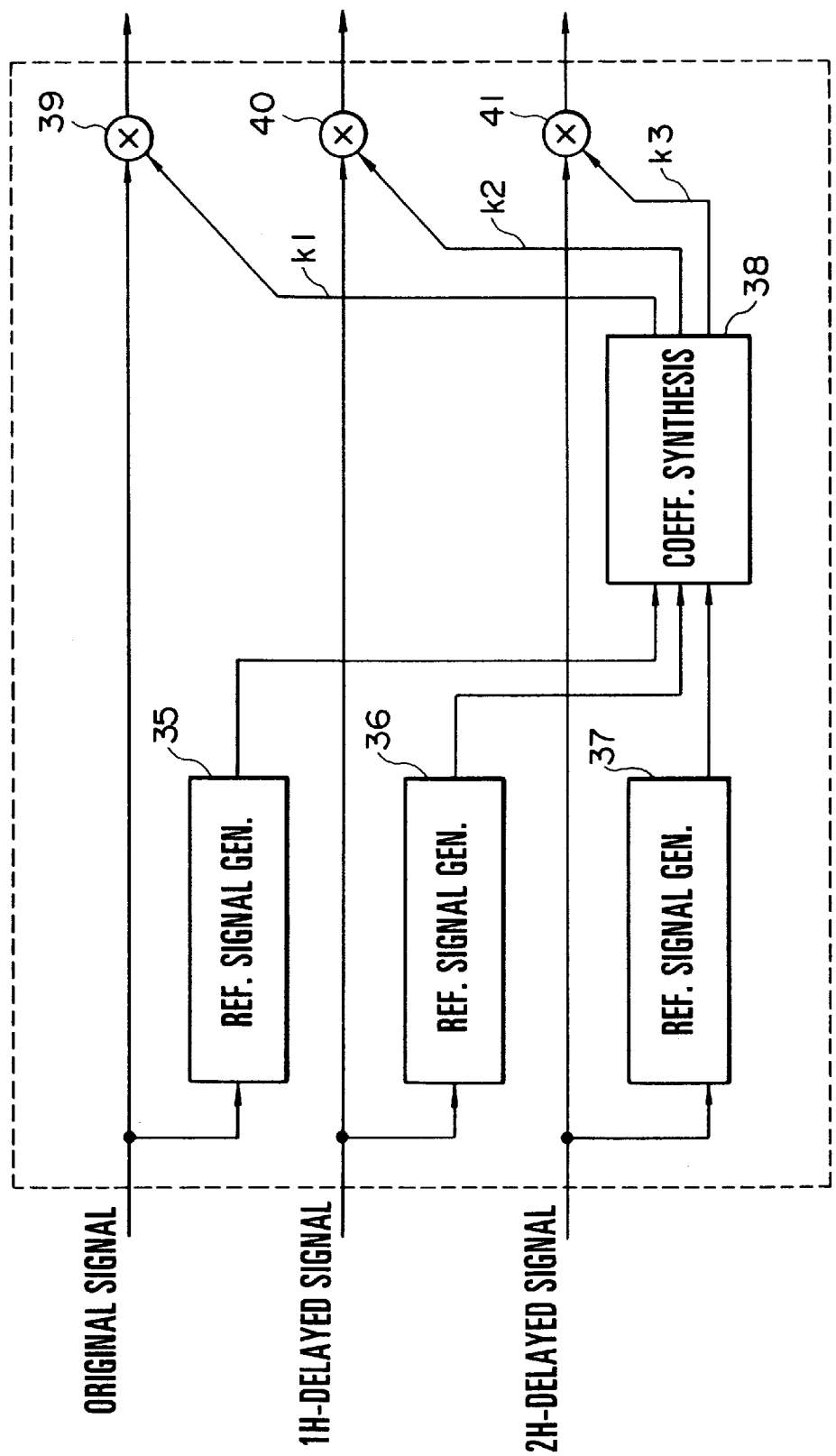
FIG. 21 shows one specified example of an adapted color processor.

In FIG. 20, reference numeral 34 denotes an adaptive color processor which receives the original signal, 1 H- and 2 H-delayed signals, adjusts the gains of the signals to appropriate levels in vertical edge and then feeds the three line signals to a complementary separator 3. The operation of the adaptive color processor 34 will be described next in more detail. In FIG. 21, reference numerals 35–37 each denote a reference signal generator; 38, a coefficient synthesis unit; 39–41 each, a multiplier. The reference signal generators 35–37 each detect a signal level which is a reference for each line and adjusts the gains of the respective lines at rates corresponding to those reference signals, so that the luminance signals are required to have the same composition.

Since

Mg+G=R+B+G

Ye+Cy=R+B+2G,

G in the Mg and G line is doubled as follows;

Mg+2G=R+B+2G to obtain luminance signals coincident in composition. Now let the original signal, 1 H- and 2 H-delayed signals be S(n), S(n−1), S(n−2), respectively. The outputs of the reference signal generators 35–37 contain reference signals Y(n), Y(n−1), and Y(n−2) in the respective lines. Those reference signals are fed to the coefficient synthesis unit 38 to produce gain coefficients k1, k2 and k3 for the original signal S(n), 1 H-delayed signal S(n−1), and 2 H-delayed S(n−2), respectively. The original signal S(n), 1 H-delayed signal S(n−1), and 2 H-delayed S(n−2) are multiplied by the coefficients k1,k2 and k3 in the multipliers 39–41, respectively.

In this way, the respective gain coefficients for the lines are produced. An excess of the interpolated signal over the original signal in level would lead to a deterioration in the S/N ratio, Thus, the coefficients are produced such that the interpolated signal does not exceed the original signal in level. For example, the coefficients k1, k2 and k3 are set as follows:

$$k1=Y(n-1)/\text{Max}(Y(n), Y(n-1))$$

$$k2=[Y(n)/\text{Max}(Y(n-1), Y(n))+Y(n-2)/\text{Max}(Y(n-1), Y(n-2))]/2$$

$$k3=Y(n-1)/\text{Max}(Y(n-1), Y(n-2)).$$

For the coefficient k1, its denominator is Max(Y(n), Y(n−1)), so that if Y(n−1)≦Y(n), k1=Y(n−1)/Y(n)≦1. Thus, even if Y(n−1)>Y(n), k1 is not greater than 1 (unity). Thus, no original signal S(n) is amplified by interpolation. This applies to the coefficient k3. K2 is also not greater than 1. In order to obtain accurate color reproduction, S(n−1) is adjusted in level so as to be equal to S(n) and S(n−2).

FIG. 22 is a block diagram of one specified example of the reference signal generator of FIG. 21. Reference numerals 42–45 each denote a 1-pixel delay unit; 46–55 each, a coefficient unit; 56–60 each, switching unit; and 61, an adder. Assume now that signals are output at the pixel arrangement of FIG. 4. In this case, the switching units 56–60 is switched such that reference signals in the lines S(n) and S(n−2) which output Mg and G are:

$$S(n)=G+Mg+2G+Mg+G=2R+2B+4G$$

$$S(n-2)=1/2Mg+2G+Mg+2G+1/2Mg=2R+2B+4G$$

and that a reference signal in the line S(n−1) which outputs Ye and Cy is:

$$S(n-1)=1/2Ye+Cy+Ye+Cy+1/2Ye=2R+2B+4G$$

That is, the coefficients are switched sequentially at intervals of 4 H to provide reference signals where the compositions of the respective lines are coincident with each other.

FIG. 23 is a block diagram of one specified example of the coefficient synthesis unit 38 of FIG. 21. Reference numerals 62, 63 each denote a comparator; 64–67 each, a divider; 68, an adder; and 69, a coefficient unit.

In FIG. 23, the comparator 62 compares input reference signals Y(n) and Y(n−1) to select and output the larger one of those signals to the divider 65 where the reference signal Y(n−1) is divided by the selected reference signal. The output signal of the divider 65 is k1. Similarly, the comparator 63 and the divider 66 produces k3 on the basis of the input signals Y(n−1) and Y(n−2). The output signal from the comparator 62 is fed to the divider 64 to divide the reference signal Y(n). The output signal from the comparator 63 is fed to the divider 67 to divide the reference signal Y(n−2). The output signals of the dividers 64 and 67 are added and averaged by the adder 68 and the coefficient unit 69 to provide the coefficient k2.

As described above, according to the above embodiment, the vertical-direction correlation is not reduced even when a vertical edge is present. Thus, a digital camera is realized in which no S/N ratio is deteriorated and where a vertical color moiré is reduced and a deterioration in the vertical color resolution of a color signal is low.

Figure 24:
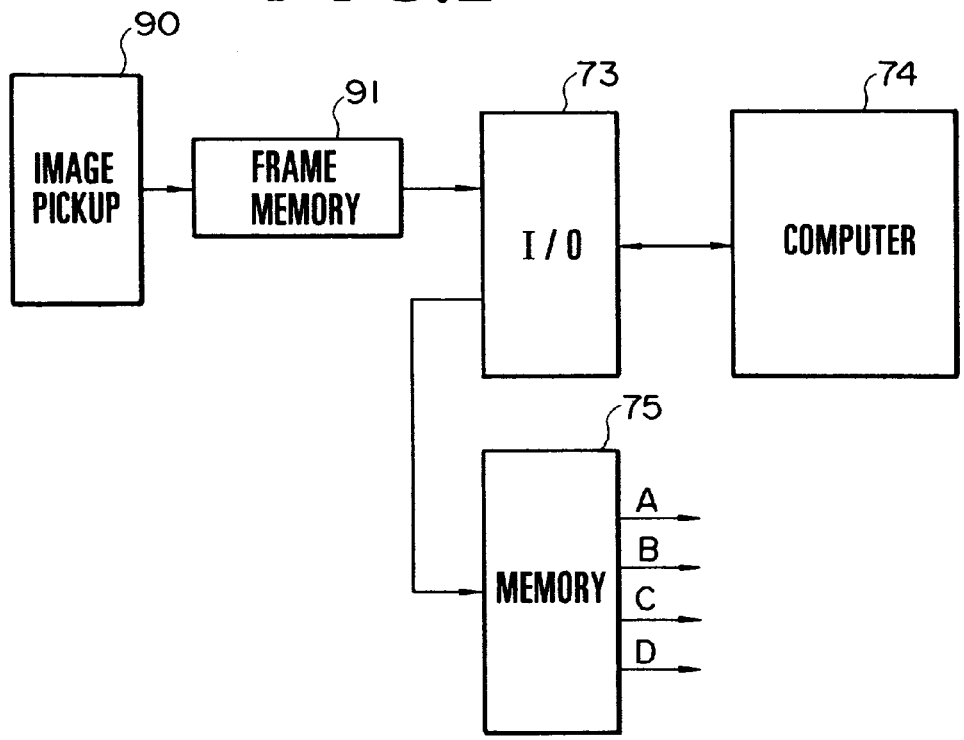
FIG. 24 is a block diagram of a further embodiment of the present invention.

FIG. 24 is a block diagram of a further embodiment of the present invention, which is the same in structure as the previous embodiments except that the image signal from the image pickup unit is fed to the computer where the signal is processed by software to provide the resulting signal. The same reference numeral is used to identify elements having the same function and performing the same operation in FIGS. 24 and the corresponding previous Figures. Further description of such element will be omitted.

In FIG. 24, reference numeral 73 denotes an I/O interface; 74, a computer; and 75, a memory. The signal read out from the image pickup element 90 without the pixels being mixed is stored in the frame memory 91 from which a signal is fed as image data to the computer 74 through the interface 73. The computer 74 processes the image data by software, for example, in accordance with the interpolation expressions of the FIG. 14 embodiment to thereby produce interpolated color signal data. It is needless to say, even in other embodiments, that software processing can be easily carried out because of the calculation processing of signals.

The color signal data thus produced by software is fed to the memory 70 through the interface 73. The signal is then output from the memory 75 in a predetermined timing to interpolate and produce a color signal for each pixel.

According to the present embodiment since the color signal is interpolated and produced by software, the respective processing operations described with respect to other embodiments of the present invention are easily performed without changing the hardware used, and a digital camera is realized which is high in the degree of freedom of design in accordance with a required image quality. While in the present embodiment the respective pixel signals are described as being interpolated and produced, the RGB signal or the color difference signals R-Y and B-Y may be produced by software, of course.

Thus, signals may be processed on a real time basis or at low speed in accordance with the processing speed of the computer.

Figure 25:
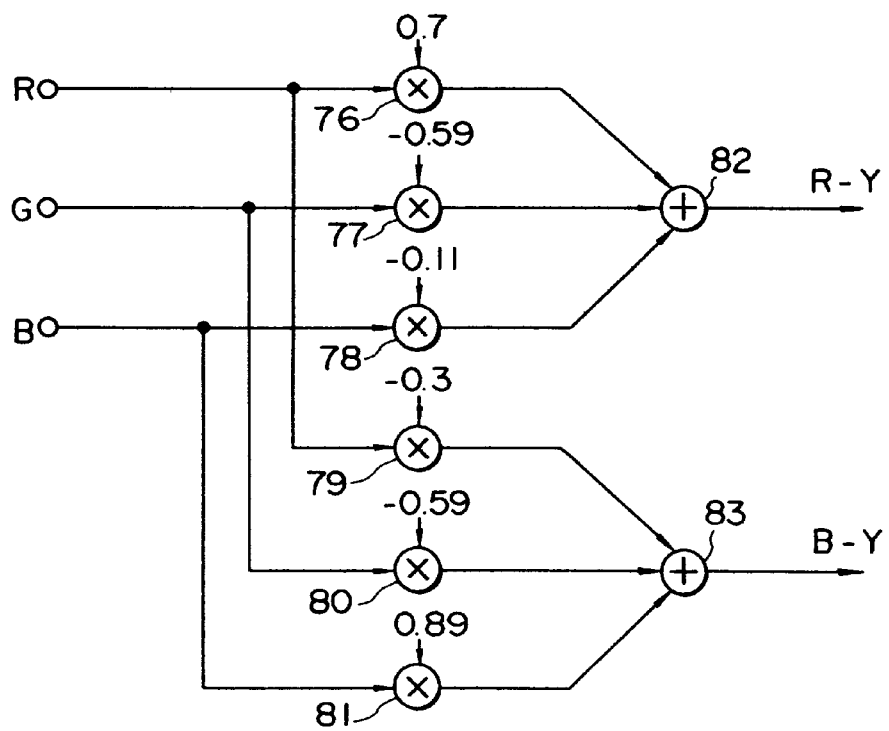
FIG. 25 is a block diagram of a further embodiment of the present invention.

FIG. 25 is a block diagram of a further embodiment of the present invention, which illustratively produces color difference signals R-Y, B-Y from the RGB signal produced in the previous embodiments. In FIG. 25, reference numerals 76–81 each denote a multiplier; and 82–83 each, an adder. The R, G and B signals are fed to the multipliers 76–78 and 79–81 such that the multipliers 76–78 sequentially multiply the R, G and B signals by 0.7, −0.59 and −611, respectively, and that the multipliers 79–81 sequentially multiply the R, G and B signals by −0.3, −0.59 and 0.89, respectively. The signals output from those multipliers are added in the corresponding adders 82–83. The adder 82 outputs:

$$0.7R-0.59G-0.11B.$$

The adder 83 outputs:

$$0.89B-0.59G-0.3R.$$

The signals expressed by those two expressions are respectively R-Y, B-Y signals. By using the multiplication coefficients; 0.3; 0.59; and 0.11, a luminance signal Y is obtained, of course, which is given by $$0.3R+0.59G+0.11B.$$

As described above, according to the present embodiment, not only the R, G and B signals but also the color difference signals R-Y, B-Y or the luminance Y are produced. Also, in the present embodiment, an image signal is fed to the computer to produce a luminance signal by software as in the FIG. 24 embodiment, of course.

The above refers to embodiments which record a still picture without impairing the frame information (called a full mode). An embodiment which involves a deterioration in the picture quality but records a still picture using a memory having a small capacity (call an economy mode) will be described next.

The image pickup element 104 outputs a signal in the general pixel mixing and reading process even in the image pickup of a still picture. The signals from the image pickup element 104 are thinned one out of two in a horizontal direction by the memory control unit 109 of the FIG. 1 embodiment and the resulting signal is stored in the memory 108 the signal from which is subjected to matrix processing as in the image pickup of the dynamic picture to produce a luminance signal and a color difference signal. In the FIG. 12 embodiment, the signal interpolator 253 interpolates the image signal one signal out of two in the horizontal direction to reduce the number of signals and records the resulting signal in the memory 254. By the above operation, the number of signals is reduced to one half both in the vertical and horizontal directions compared to the full mode. Thus, four times the number of still pictures stored so far can be stored in the memories 108 and 254. The full/economy selection switch 119 selects one of the full mode and economy mode and the view finder 118 displays the number of further still pictures which are storable in the memory 108 and 254 depending on the selected mode. The view finder displays the selected mode.

Figure 27:
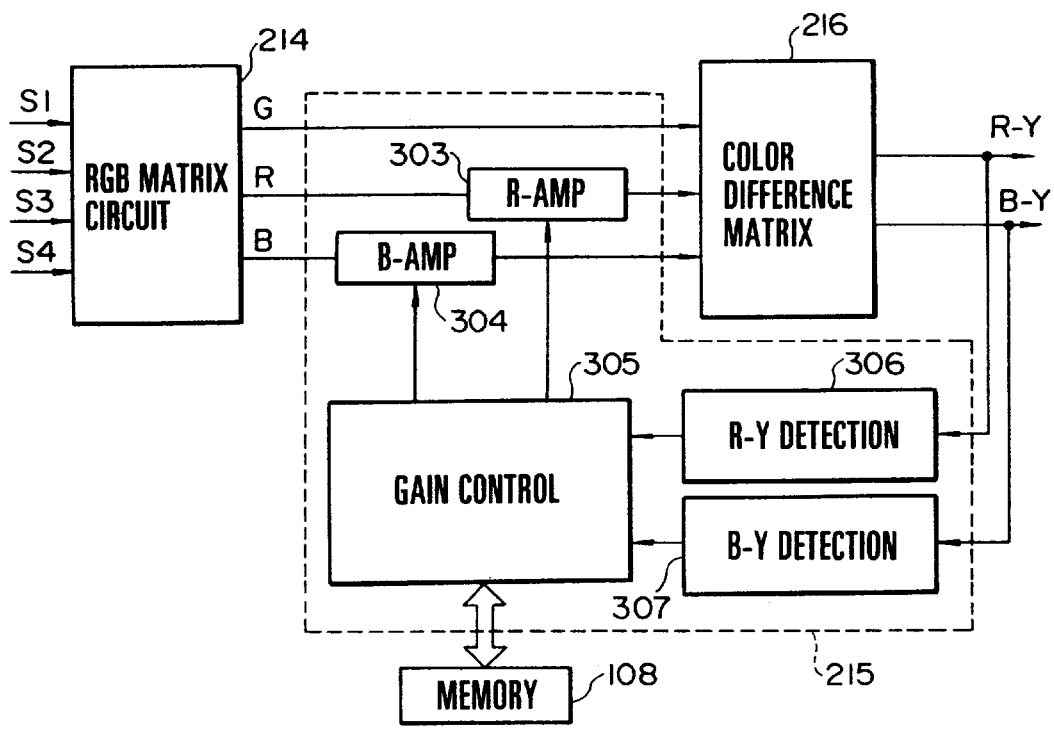
FIG. 27 is a schematic of a white balancing unit.

FIG. 27 shows a further embodiment of the present invention. FIG. 27 shows the internal structure of the white balancing unit 215. Reference numeral 303 denotes R-amplifier; 304, a B-amplifier; 305, a gain control unit; 306, an R-Y detector; and 307, a B-Y detector. The white balancing control in the present invention includes determination of "white deviation" in the R-Y and B-Y detectors 306 and 307 on the basis of the R-Y and B-Y color difference signals produced by the color difference matrix unit 216, and gain control of the R-Y and B-Y amplifiers 303 and 304 by the gain control unit 305 on the basis of the "white deviation" information. When the shutter button 111 is depressed, the gains of the R- and B-amplifiers 303 and 304 calculated from one field or the averaged value of a plurality of fields directly before the shutter is closed and the image signal read out from the image pickup element 104 are recorded in the memory 108. In reproduction, the R- and B-amplifiers 303 and 304 are set at the above gains recorded in the memory 108 to produce an image signal.

Figure 28A:
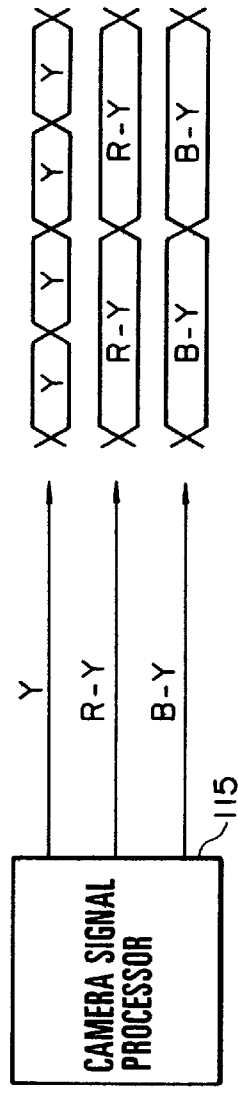
FIGS. 28A, 28B, 28C are specified examples of signal outputs.
Figure 28B:
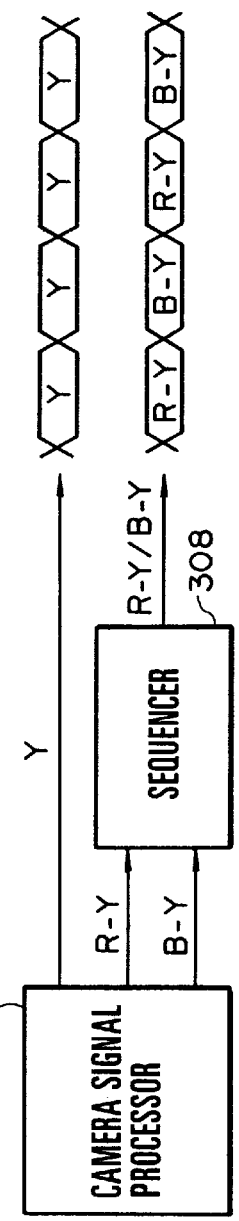
Figure 28C:
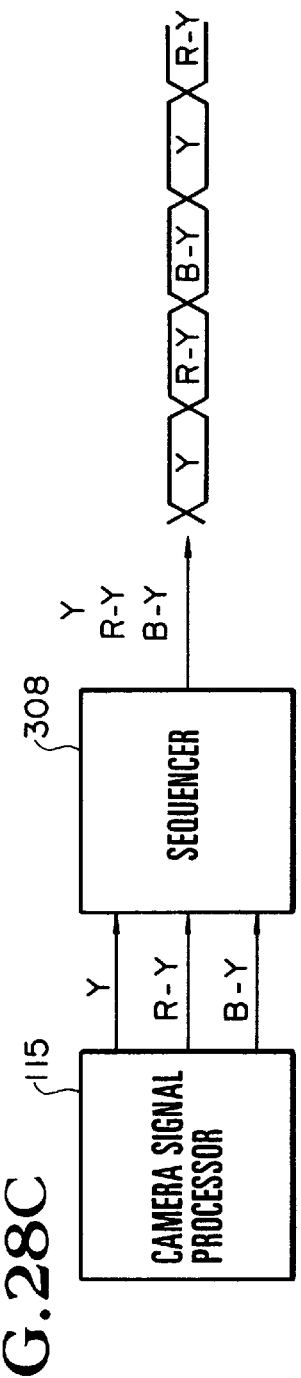
Figure 29A:
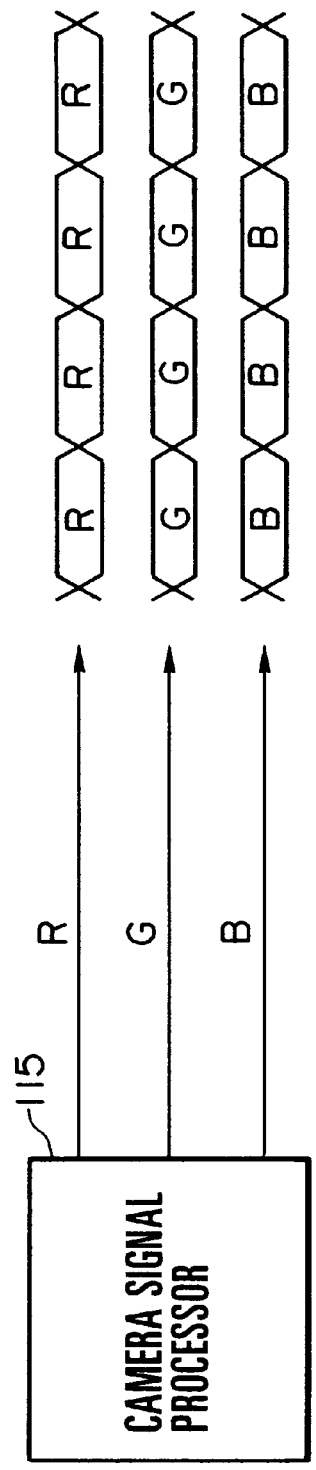
FIGS. 29A, 29B are specified examples of signal outputs.
Figure 29B:
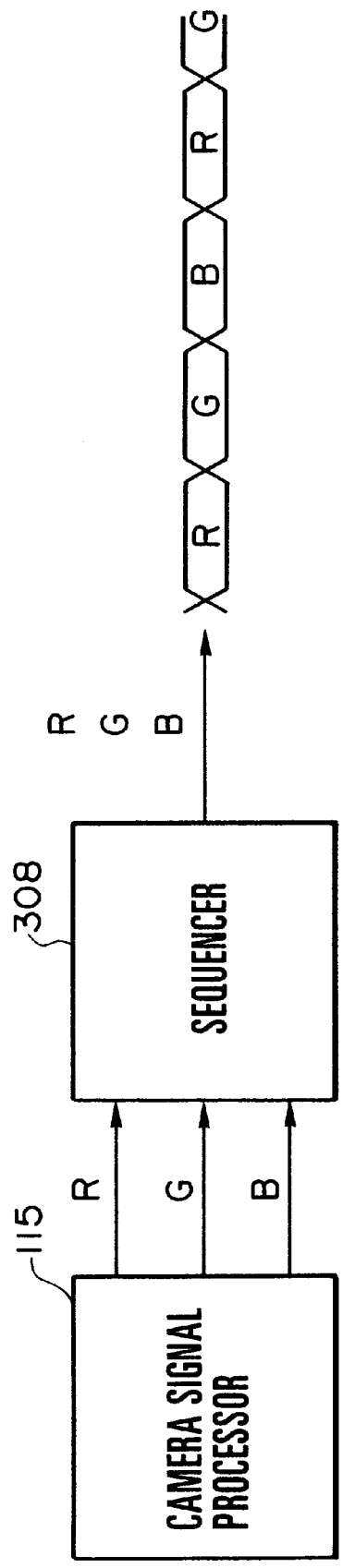
Figure 30A:
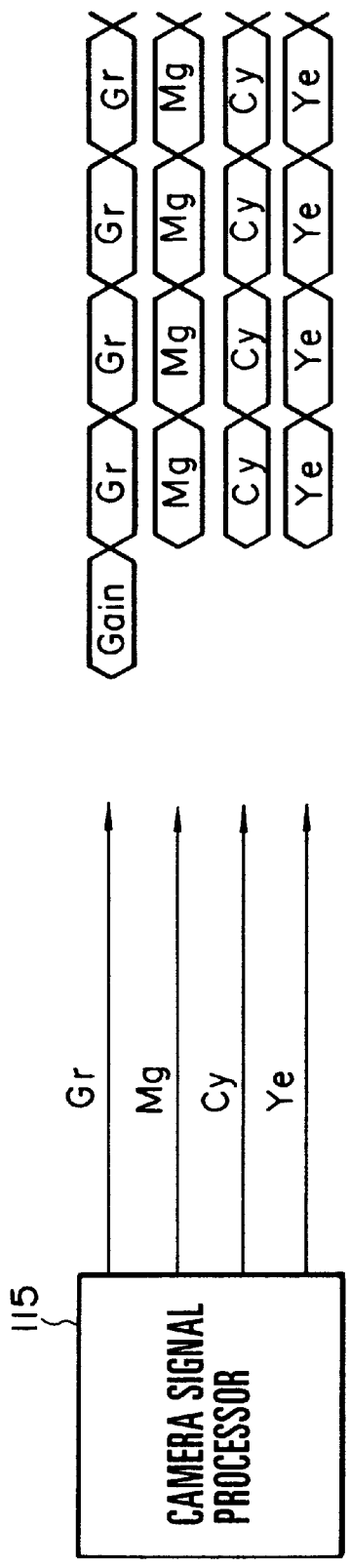
FIGS. 30A, 30B are specified examples of signal outputs.
Figure 30B:
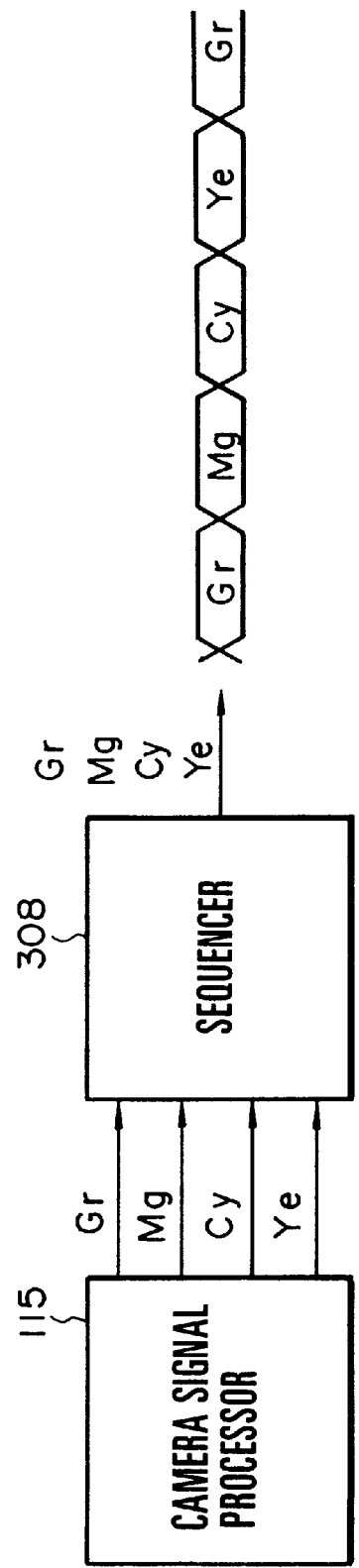

FIGS. 28–30 show a further embodiment of the present invention in which the signal processor 114 outputs digital image signals. FIGS. 28A, 28B, 28C illustrate output luminance signal and color difference signals. FIGS. 29A, 29B illustrate output R, G and B signals; FIGS. 30A, 30B illustrate signal outputs corresponding to color filters of the image pickup element 104. FIG. 28A shows the manner of outputting a general luminance signal/color difference signals (4:2:2 digital) as separate Y, R-Y and B-Y. FIG. 28B shows color difference signals R-Y, B-Y sequenced and output by a sequencer 308. FIG. 28C shows all signals Y, R-Y and B-Y sequenced and output. FIG. 29A shows separately extracted R, G and B signals. FIG. 29B shows the R, G and B signals sequenced and output by the sequencer 310. R, G and B signals output in FIGS. 29A, 29B are before-hand subjected to white balancing control. By adding the R and B gain information to the output data, white balancing control may be provided externally without it being controlled in the device. This applies similarly to FIGS. 30A, 30B processing. The processor 115 outputs Gr, Mg, Cy, Ye complementary signals obtained from the image pickup element 104 without those signals being subjected to white balancing control. Although not shown, parameters such as R and B gains which are subjected to various signal processing operations are added to the head of the output data. When the R, G and B signals are sequenced and output, the matrix coefficient M3 of the color difference matrix unit 216 is set at:

$$M_{51}=1, M_{52}=0, M_{53}=0$$
$$M_{61}=0, M_{62}=0, M_{63}=0 \qquad (4)$$

The R-Y output channel outputs an R signal; thereafter, signals are again read out from the memory 108 or 254. The matrix coefficient M3 of the color difference matrix unit 216 is set at:

$$M_{51}=0, M_{52}=1, M_{53}=0$$
$$M_{61}=0, M_{62}=0, M_{63}=0 \qquad (5)$$

and a G-signal is output from the R-Y output channel. Thereafter, signals are read out from the memory 108 or 254 and the matrix coefficient M3 of the color difference matrix 216 is set at:

$$M_{51}=0, M_{52}0, M_{53}=1$$
$$M_{61}=0, M_{62}=0, M_{63}=0 \qquad (6)$$

and B-signal may be output from the R-Y output channel.

A further embodiment of the present invention will be described with reference to the drawings.

Figure 31:
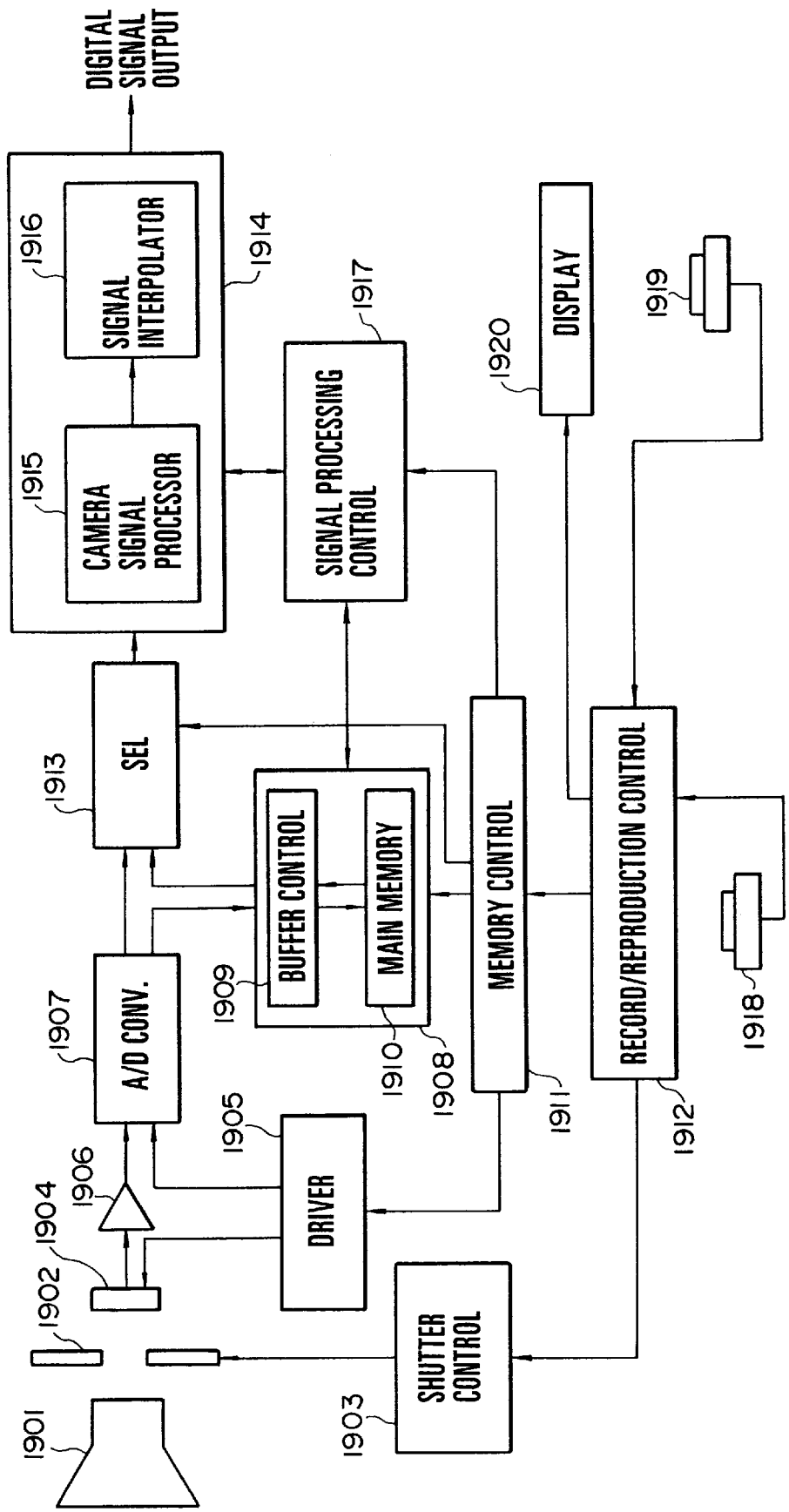
FIG. 31 is a block diagram of an embodiment of the present invention.

FIG. 31 is a schematic of the digital camera as the further embodiment of the present invention. In FIG. 31, reference numeral 1901 denotes a lens; 1902, a shutter; 1903, a shutter control unit; 1904, an image pickup element; 1905, a driver; 1906, an amplifier; 1907, an A/D converter; 1908, a memory; 1909, a buffer memory;

1910, a main memory; 1911, a memory control unit; 1912, a record/reproduction control unit; 1913, a selector; 1914, a signal processor; 1915, a cameral signal processor; 1916, a signal interpolator; 1917, a signal processing control unit; 1918, a shutter button; 1919, a full/economy selection switch; and 1920, a display. A specified example of the image pickup unit 1904 is shown in FIG. 2. In FIG. 2, reference numeral 201 denotes a photodiode; 202, a vertical CCD; 203, a horizontal CCD; gy, mg, cy, and ye, green, magenta, cyan and yellow color filters disposed at the respective photodiodes 201. In the arrangement, the light entering through the lens 1901 passes through the shutter 1902, the stop F of which is controlled by the shutter control unit 1903, to the image pickup unit 1904. The light is then subjected to opto-electric conversion by the photodiodes 201 of FIG. 2 disposed on the image pickup unit 1904 to signal electric charges, which are then transferred through the vertical CCD 202 to the horizontal CCD 203 and then converted to a voltage synchronously with a horizontal scan pulse fed from the driver 1905 and the voltage signal is output.

A dynamic picture image pickup will be next described. The image pickup unit 1904 reads out signals in a so-called pixel mixing process where two pixel signals adjoining in the vertical direction are mixed and read out, as described in the prior art.

The output signal from the image pickup unit 1904 is amplified by the amplifier 1906 and then input to the A/D converter 1907, where the signal is sampled and converted to a digital signal in accordance with a timing pulse fed from the driver 1905. The digital signal is input by the selector 1913 to the signal processor 1914, which performs general signal processing operations such as gammer-adjustment and white balancing adjustment to produce a luminance signal and color (R, G, B) signals.

Recording a still picture will be described next.

In the arrangement, by depression of the shutter button 1918, the record/reproduction control unit 1912 feeds a shutter closer control signal to the shutter control unit 1903, which closes the shutter 1902 a predetermined time after receipt of the control signal. Light entering the image pickup unit 1904 by the time when the shutter 1902 is closed is subjected to photo-electric conversion by the photodiodes 201 disposed in the image pickup unit 1904; transferred through the vertical CCD 202 to the horizontal CCD 203 during the shutter 1902 being in a closed state; converted to a voltage synchronously with a horizontal scan pulse fed from the driver 1902; and then output. Reading a signal once from the photodiodes 201 at that time is so-called destructive reading where no signal remains in the photodiodes 201. Thus, if pixel mixing and reading is performed as in the dynamic picture reading, information in the frame would be lost. In order to avoid this reading, independent reading is made to obtain a still picture without deteriorating the vertical resolution.

The signals Gy, Mg, Cy and Ye read independently from the corresponding pixels in the above operation are converted by the A/D converter 1907 to corresponding digital signals, which are then recorded in the memory 1908 controlled by the memory control unit 1911. Information on the white balancing performed by the signal processor 1914 in the dynamic picture taking operation performed before the still picture recording operation is also recorded in the memory 1908. Information such as the white balancing may be recorded in another recording means.

The operation of outputting a recorded still picture will be described next.

A signal recorded in the memory 1908 is selected by the selector 1913 and input to the signal processor 1914, which reads information on the white balancing, etc., and produces a predetermined image signal on the basis of that information. Photodiodes 201 provided in the image pickup unit 1904 are disposed at generally different horizontal and vertical spacings. That is, the photodiodes 201 each are also called a pixel where the pixel pitches or spacings Px and Py of FIG. 2 are not equal. Thus, an optical image is not sampled spatially at equal intervals, so that the image pickup unit is undesirable as image inputting means. Thus, the signal interpolator 1916 performs an interpolating operation to equalize the horizontal and vertical pixel pitches. This interpolation will be described next with respect to FIGS. 26, 32 and 33.

Figure 32:
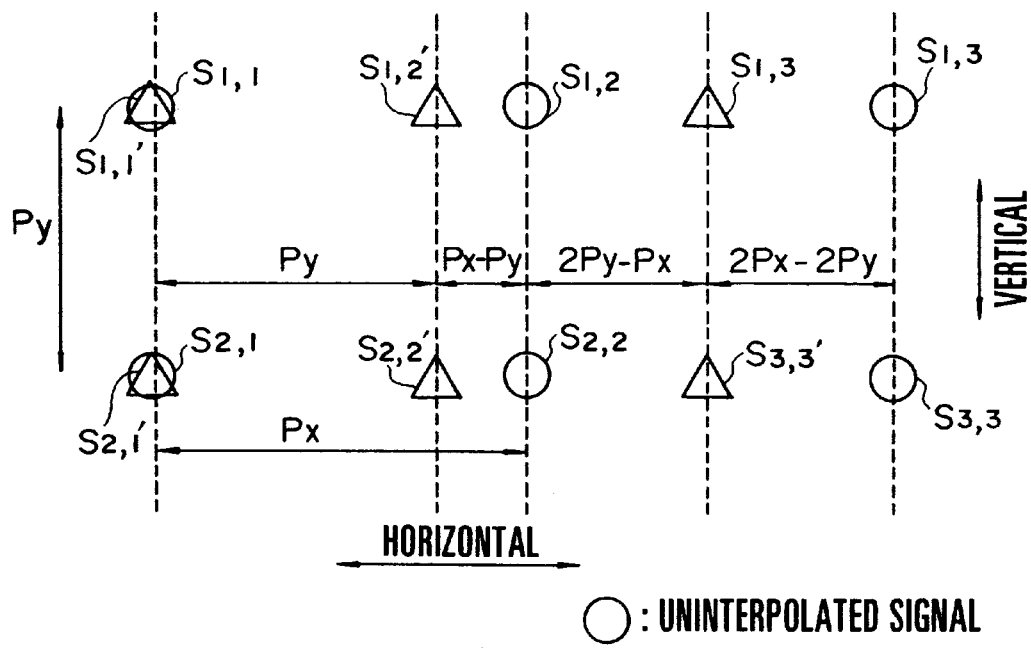
FIG. 32 illustrates a spatial distribution of signals in the embodiment of the present invention.

FIG. 26 is a specified example of a signal interpolator 1916. In FIG. 32, $S_{1.1}, S_{1.2}, S_{1.3}, S_{2.1}, S_{2.2}, S^{2.3}$ each denoted by a circle show a spatial distribution of signals (uninterpolated) entering the signal interpolator 1916; $S_{1.1}'$, $S_{1.2}', S_{1.3}', S_{2.1}', S_{2.2}', S_{2.3}'$ each denoted by a triangle show a spatial distribution of signal output (interpolated) from the adder 404. The uninterpolated signals are spaced by an integer times Px and an integer times Py in the horizontal and vertical directions, respectively, where Px and Py are horizontal and vertical pixel pitches. In this case, assume that the uninterpolated signals are spaced by Px, Py, for simplifying purposes. If an interpolated signal expressed by $S_{1.1}'$ is produced at the position of $S_{1.1}$, the interpolated signals $S_{1.2}', S_{1.3}'$ each shown by a triangle are required to be produced at positions spaced by Py and 2 Py in the horizontal direction from $S_{1.1}'$. Thus, the interpolated signals $S_{1.2}', S_{1.3}'$ are obtained by interpolation as follows:

$$S_{1.2}'S_{1.1}*(Px-Py)/Px+S_{1.2}*Py/Px \quad (7)$$

$$S_{1.3}'S_{1.2}*(2Px-Py)/Px+S_{1.3}*(2Py-Px)Px \quad (8)$$

In other words, let the number of vertical pixels and the number of horizontal pixels be M, N, respectively. N' data items in the horizontal direction are required to be produced in interpolation:

$$N'=N*Px/Py \quad (9)$$

However, the image signal thus interpolated becomes dull in the horizontal direction since the number of interpolated signals is larger than that of original signals. To avoid this situation, the image pickup unit 1904 is supplied with horizontal scan pulses which are higher in speed than the horizontal scan pulse having a frequency calculated from the number of horizontal pixels of the image pickup unit 1904. A specified method for this purpose will be described with reference to FIG. 33.

When the image pickup unit 1904 used is of a general NTSC system where the horizontal pixel pitch Px is 9.6 µm; the vertical pixel pitch Py is 7.5 µm; the number of horizontal pixels is 510; and the number of vertical pixels is 485, the frequency of horizontal scanning pulses obtained from the number of horizontal pixels is 610 $f_H$ where $f_H$ is the horizontal frequency, and given by $$510*63.56/(63.56-10.5)=610.9 \approx =611 \quad (10)$$

The number of signals in the horizontal direction produced by interpolation from the expression (9) is given by $$510*9.6/7.5=652.8 \approx 653 \quad (11)$$

Thus, the use of a horizontal scan pulse signal having a frequency of 611 $f_H$ would not complete interpolation within one horizontal interval. In order to solve this problem, the frequency of horizontal scan pulses used are required to be 782 $f_H$ given by $$653*63.56/(63.56-10.5)=782.2 \approx 782 \quad (12)$$

Figure 33:
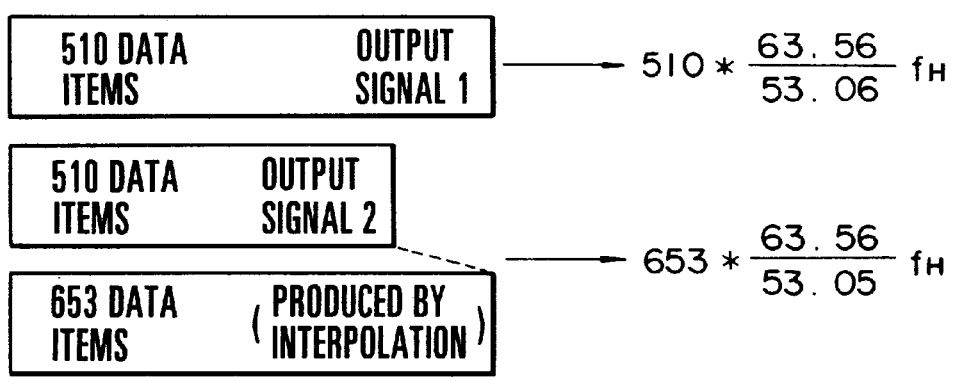
FIG. 33 is a timing chart of an output signal from an image pickup unit of the embodiment of the present invention.

FIG. 33 shows the timing chart of output signals read out from image pickup unit. Output signal 1 is a output signal from image pickup unit when the frequency of horizontal scan pulse is 611 $f_H$. And output signal 2 is an output signal from image pick up unit when the frequency of horizontal scan pulse is 782 $f_H$. In the present embodiment, the output signal 2 is obtained which is reduced at a rate of 510/653 (or 7.5/9.6) in the horizontal direction using the horizontal scan pulse sgnaof 782 $f_H$. Since the output signal 2 is multiplied by 653/510 (or 9.6/7.5) in the horizontal direction by the signal interpolation, the resulting image signal aspect ratio is unchanged.

Writing an image signal into the memory 1908 will be described next.

In the recording of a still picture, the respective pixel signals are independently read out from the image pickup unit 1904 in an independent reading manner and converted to corresponding digital signals by the A/D converter 1907 and recorded in the memory 1908.

Figure 34:
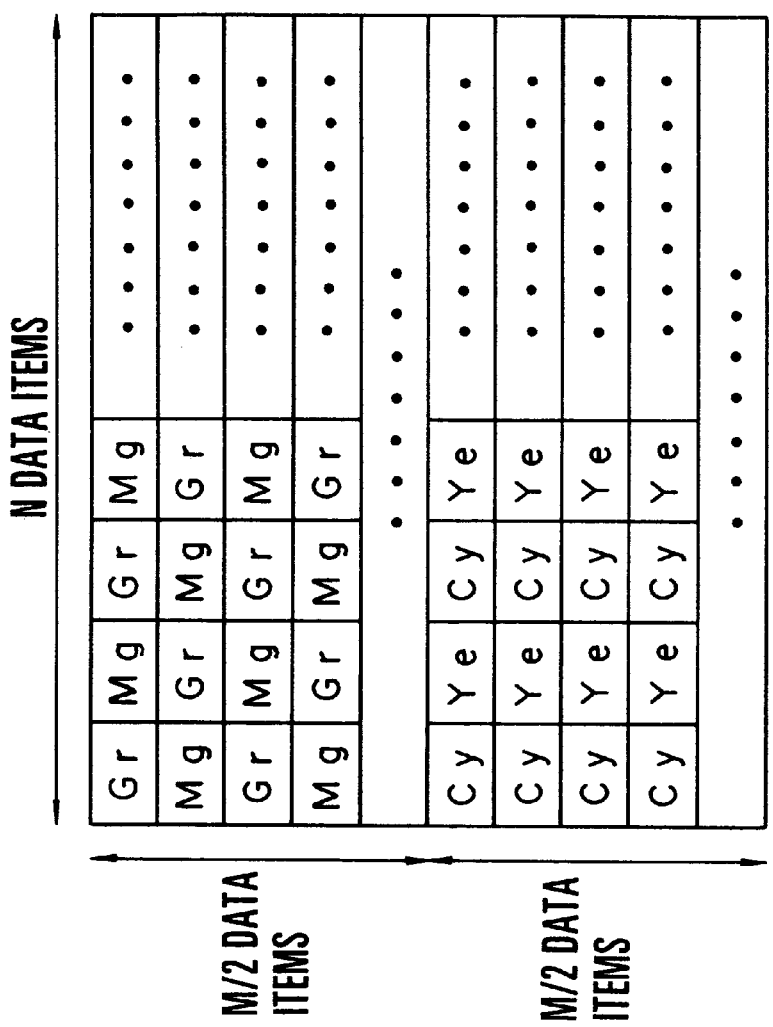
FIG. 34 is a signal format used in an independent reading operation in the embodiment of the present invention.

As shown in FIG. 4, in a field where a vertical transfer pulse Vl becomes a three-valued pulse, Mg, Gr are output sequentially. In a field where V3 becomes a 3-valued pulse, Cy and Ye are output, so that they are recorded in a format of FIG. 34 in memory 1908. When a still picture is to be output, the signals recorded in the memory 1908 are sequentially read out to produce an image signal having a predetermined format in the signal processor 1914. For example, in order to produce three primary signals R, G. and B, the following matrix operation is performed to interpolate R, G and B signals, as mentioned above.

$$R = Mg - Cy + Ye$$

$$G = -Mg + Cy + Ye + Gr$$

$$B = Mg + Cy - Ye. \tag{13}$$

At this time, if the memory 1908 is disposed at the end of the signal processor 1914; the signal output from the image pickup unit 1904 is processed in accordance with the expression (13) to thereby produce interpolated R, G, and B signals; and those R, G, and B signals are recorded in the memory 1908, a memory capacity required for recording pixel signals for one frame is given by $$485 * 653 * 3(RGB) * 9 \text{ bits} \approx 8.6 \text{ Mbits} \tag{14}$$

The numerals "485", "653" are the number of lines and the number of horizontal dots, respectively, and the resolution of the A/D converter 1907 is 9 bits. In the present embodiment, the following capacity will suffice $$485 * 510 * 9 \text{ bits} \approx 2.2 \text{ Mbits} \tag{15}$$

That is, data is compressed to about 1–4 by recording complementary signals.

Figure 35:
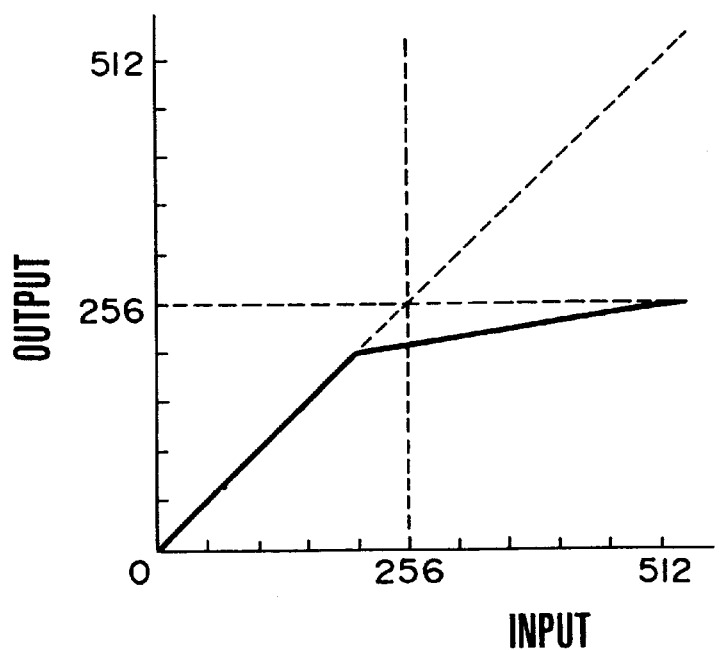
FIG. 35 illustrates a non-linear input-output characteristic in the embodiment of the present invention.
Figure 36:
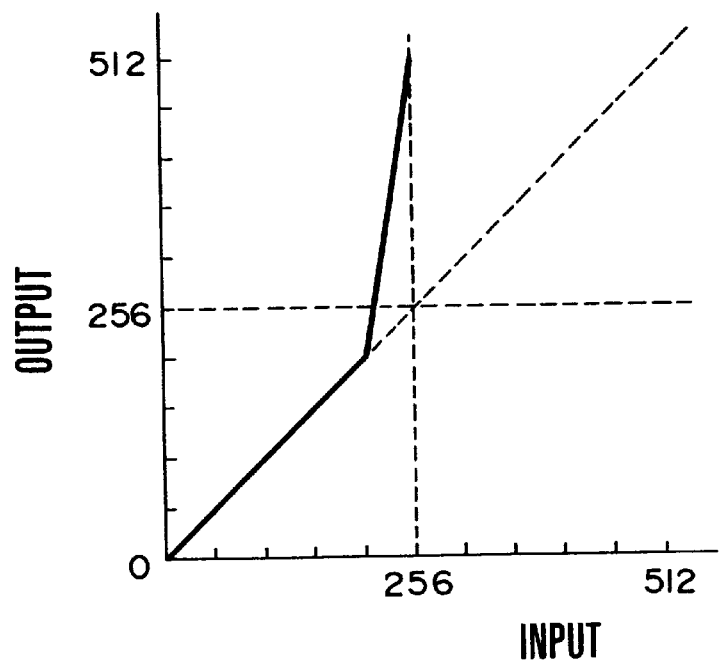
FIG. 36 illustrates a non-linear input-output characteristic in the embodiment of the present invention.

The reason why the resolution of the A/D converter 1907 is 9 bits in the expressions (14) and (15) is based on the evaluation of the image quality that a deterioration in the S/N ratio due to quantization error exceeds an allowable value when the resolution is 8 bits. However, when a general purpose memory is used as the memory 1908, and considering that the bit structure of the general purpose memory is 8 bits in depth, the resolution of A/D converter 1907 is preferably 8 bits. Thus, the amplifier 1906 has a non-linear input-output characteristic of FIG. 35 to thereby convert the input signal to a digital signal with a 8-bit resolution. In a low-luminance area where quantization noise is noticeable, the input is converted by the A/D converter 1907 to a digital signal with a 9-bit resolution while in a high luminance area where no quantization noise is noticeable, the input signal is converted to a digital signal with a 8-bit or less resolution to thereby compress the data to use a general memory of 8 bits. At this time, linear signal processing is performed by the use of the signal processor 1914 having an input-output characteristic of FIG. 36 reverse to that of FIG. 35. The non-linear input-output characteristic is easily realized by changing the gain of the amplifier 1906 in accordance with the input signal level.

A specified illustrative structure of the memory 1908 of FIG. 31 will be described next.

As shown in FIG. 31, the memory 1908 is composed of a main memory 1910 and a buffer memory 1909. In order to record a signal output from the A/D converter 1907, a signal is required to be input/output at a video rate to/from the memory 1908. In order to record a plurality of still pictures, a memory having a large capacity is required. However, such a memory is very expensive at present. Thus, for example, a flash memory, a magnetic disk or an optical disk which is low in data access speed, but having a large storage capacity is used as the main memory 1910 while an image memory which is operable at high speed is used as the buffer memory 1909. During recording, a signal output from the A/D converter 1907 is temporarily recorded in the buffer memory 1909 which operates at the video rate. A signal for one still picture recorded in the buffer memory 1909 is transferred and recorded to and in the main memory 1910 in conformity with the operating speed of the main memory 1910.

A method of recording a still picture with a small memory capacity but involving a deterioration in the image quality will be described below.

The mode in which the above still picture recording method is effected is called a full mode while the mode in which a still picture recording method to be described below is effected is called an economy mode.

Figure 37:
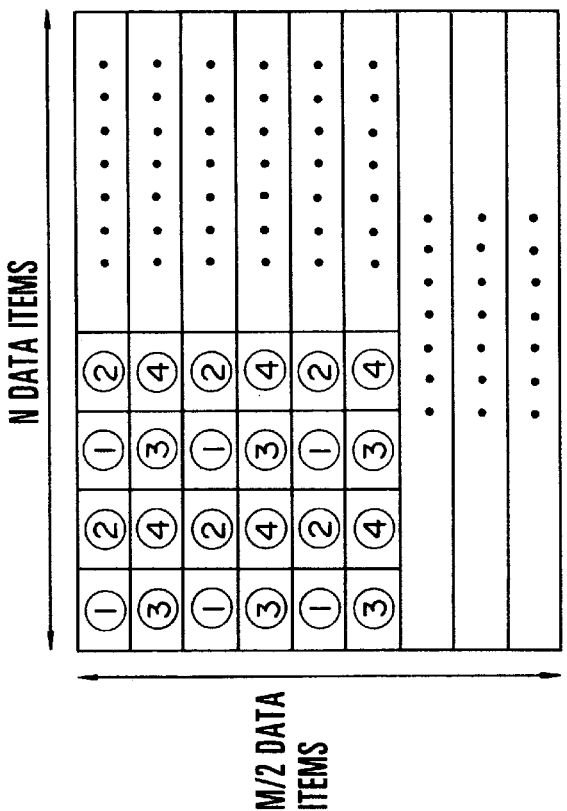
FIG. 37 is a signal format used in a pixel mixture reading operation in the embodiment of the present invention.

The image pickup unit 1904 outputs a signal in the above described general pixel mixing and reading process. The signal output from the image pickup unit 1904 is recorded in a format shown in FIG. 37 in the main memory 1910 in a manner similar to that used in the full mode image pickup. The signal recorded in the present method is different in signal format from that in the full mode of FIG. 37 while in reproduction the signal processing method is different from that performed in the full mode. Thus, when a video signal having a predetermined format is produced, an identification signal is required which indicates whether a signal is recorded in the full mode or it is recorded in the economy mode. This identification signal is recorded along with information on the white balancing.

Figure 38:
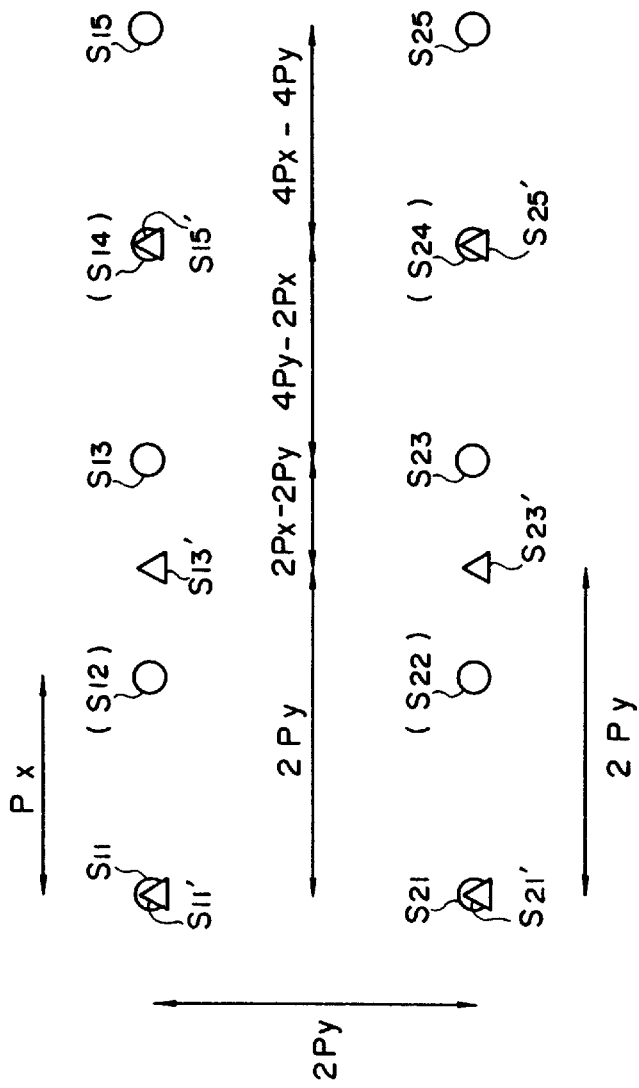
FIG. 38 illustrates a spatial distribution of signals in the embodiment of the present invention.

The operation of outputting a signal recorded in the economy mode will be described next. The signal recorded in the main memory 1910 is input to the signal processor 1914 as in the reproduction of the signal in the full mode to produce a video signal having a predetermined format on the basis of the information on the white balancing, etc. For example, in order to produce three primary colors R, G, and B. a matrix operation different from the matrix operation shown in the expression (13) is performed to thereby interpolate the R, G and B signals, as shown in FIG. 38:

$$R = 2(Mg + Ye) + (Gr + Ye) - 2(Gr + Cy)$$

$$G - (Mg + Ye) + 2(Gr + Ye) + (Gr + Cy)$$

$$B = 2(Mg + Ye) - 2(Gr + Ye) + (Gr + Cy) \tag{16}$$

In FIG. 38, $S_{1.1}$, $S_{1.2}$, $S_{1.3}$, $S_{1.4}$, $S_{1.5}$, $S_{2.1}$, $S_{2.2}$, $S_{2.3}$, $S_{2.4}$, $S_{2.5}$ each of which is denoted by a circle show a spatial distribution of signals (uninterpolated) entering the signal interpolator 1916; and $S_{1.1}'$, $S_{1.3}'$, $S_{1.5}'$, $S_{2.1}'$, $S_{2.3}'$, $S_{2.5}'$ each of which is denoted by a triangle show a spatial distribution of signals (interpolated) output from the adder 404. Since at this time the signal is read out in the pixel mixing process, the uninterpolated signals are spaced one from another by an integer times Px and an integer times 2 Py in the horizontal and vertical directions, respectively, where Px and Py are horizontal and vertical pixel pitches. In this case, assume that the uninterpolated signals are spaced one from another by Px and 2 Py, in the horizontal and vertical directions for simplifying purposes. If the signals in the horizontal direction are thinned one signal out of two, the signals are distributed one from another at horizontal and vertical spacings of 2 Px and 2 Py, respectively, in space. That is, the signals are spaced one from another at horizontal and vertical spacings of an integer times Px and an integer times Py in space. Thus, the use of the signal interpolating method of FIG. 32 serves to equalize the spatial distributions of signals in the horizontal and vertical directions.

The spacings of the video signals interpolated by the above method would increase in the horizontal direction. In order to avoid this situation, aspect conversion is performed in the method of FIG. 21.

At this time, since the image pickup unit 1904 outputs a signal in the pixel mixing process, the number of signals per still image recorded in the memory is reduced to ½ and thus, twice the number of still pictures can be recorded compared to the recording method in the full mode.

The full/economy selection switch 1919 is used to select one of the two still picture recording methods in the full and economy modes. A matrix operation expression, drive of the image pickup unit 1904 and drive of the memory 1908 are selected depending on the mode which the full/economy selection switch 1919 has selected. The display 1920 displays the recording method selected depending on the operation of the full/economy selection switch 1919 and the remaining number of still pictures which is recordable in the recording method selected at present.

A further embodiment of the present invention will be described with respect to Figures.

Figure 39:
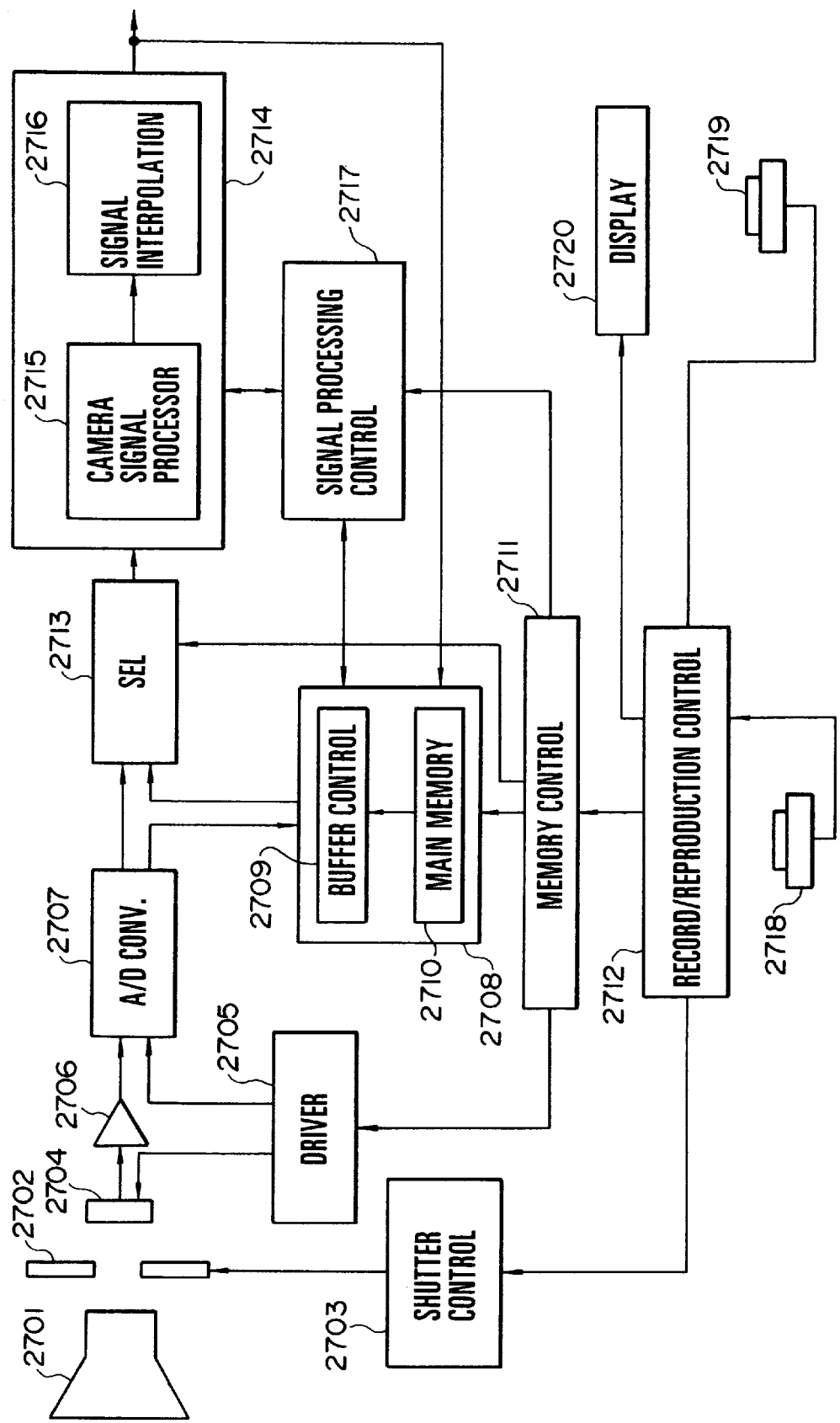
FIG. 39 is a block diagram of an image pickup unit of an embodiment of the present invention.

FIG. 39 is a schematic of a digital camera of a further embodiment of the present invention. In FIG. 39, reference numeral 2701 denotes a lens; 2702, a shutter;

2703, a shutter control unit; 2704, an image pickup unit; 2705, a driver; 2706, an amplifier; 2707, an A/D converter; 2708, a memory; 2709, a buffer memory; 2710, a main memory; 2711, a memory control unit; 2712, a record/reproduction unit; 2713, a selector; 2714, a signal processor; 2715, a camera signal processor; 2716, a signal interpolator; 2717, a signal processing control unit; 2718, a shutter button; 2719, a full/economy selection switch; and 2720, a display. The present embodiment has the same structure and operates in the same manner as the previous embodiments except in some respects which will be mainly described below.

The image pickup of the dynamic picture is exactly the same as that in the previous embodiments.

Recording a still picture in the full mode will be described next.

As in the previous embodiments, the image pickup unit 2704 outputs a signal in an independent reading manner. The signal output from the image pickup unit 2704 is converted by the A/D converter 2707 to a digital signal, which is then input to the buffer memory 2709, which records signals for one still picture therein and outputs signals through the selector 2713 to the signal processor 2714. The signal processor 2714 performs a non-linear data compression similar to that performed in the previous embodiments (compression is not necessarily required to be performed) and the resulting signals are recorded in the main memory 2710. Information on the white balancing, etc., is also recorded as in the previous embodiments.

Outputting a recorded still picture will be described next.

The signal recorded in the main memory 2710 is input to the signal processor 2714 through the selector 2713 as in the previous embodiments. If the signal processor 2714 performs a non-linear data compression during recording, it performs data compression reverse to that mentioned above, reads information on the white balancing, etc., and produces an image signal on the basis of that information and interpolates signals to equalize the horizontal and vertical pixel pitches as in the previous embodiments.

Recording signals in the memory 2708 will be described in detail below.

As shown in FIG. 39, the memory 2708 is composed of the buffer memory 2709 and main memory 2710 as in the previous embodiments. The signal output from the image pickup unit 2704 is amplified by the amplifier 2706 having a linear input-output characteristic and then input to the A/D converter 2707. In the present embodiment, the A/D converter 2707 converts the signal from the amplifier 2706 to a 9-bit digital signal for the reason described with reference to the previous embodiments. The digital signal from the A/D converter 2707 is output to the buffer memory 2709 of the main memory 2708 as in the previous embodiments. Since the number of bits of the signal output from the A/D converter 2707 is 9, the buffer memory 2709 is required to be a memory having a 9-bit depth in bit structure. The signal for one still picture recorded in the buffer memory 2709 is output through the selector 2713 to the signal processor 2714 at a data rate conforming to the operative speed of the main memory 2710. The signal processor 2714 compresses the input 9-bit digital signal to a 8-bit digital signal in conversion equivalent to the data compression due to the non-linear input-output characteristic and performed in the previous embodiments. The 8-bit digital signal is then recorded in the main memory 2710.

While in the previous embodiment the analog signal is subjected to data compression in the non-linear process, the method used in the present embodiment provides a non-linear data compression in a digital process. Thus, unevenness-free ideal data compression is provided. The signal interpolator 2716 is not required to be operated at the video rate, so that a time margin is provided for the operation and the circuit configuration is simplified.

A method of recording a still picture in a reduced memory capacity (in the economy mode), but involving a deterioration in the image quality will be described next.

Figure 40:
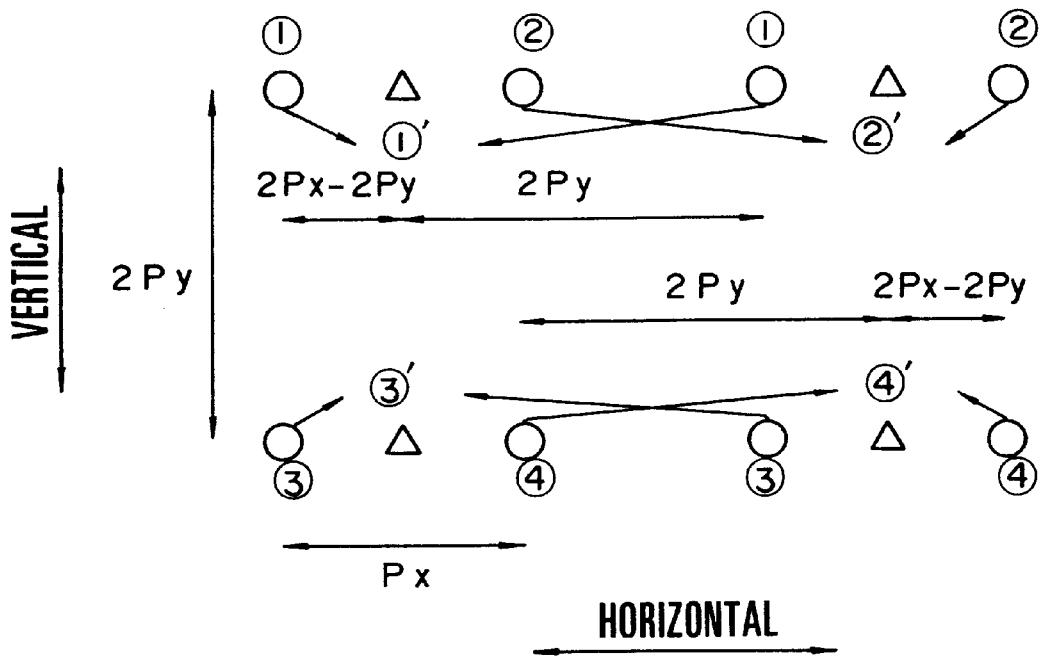
FIG. 40 illustrates a spatial distribution of signals in the embodiment of the present invention.
Figure 41:
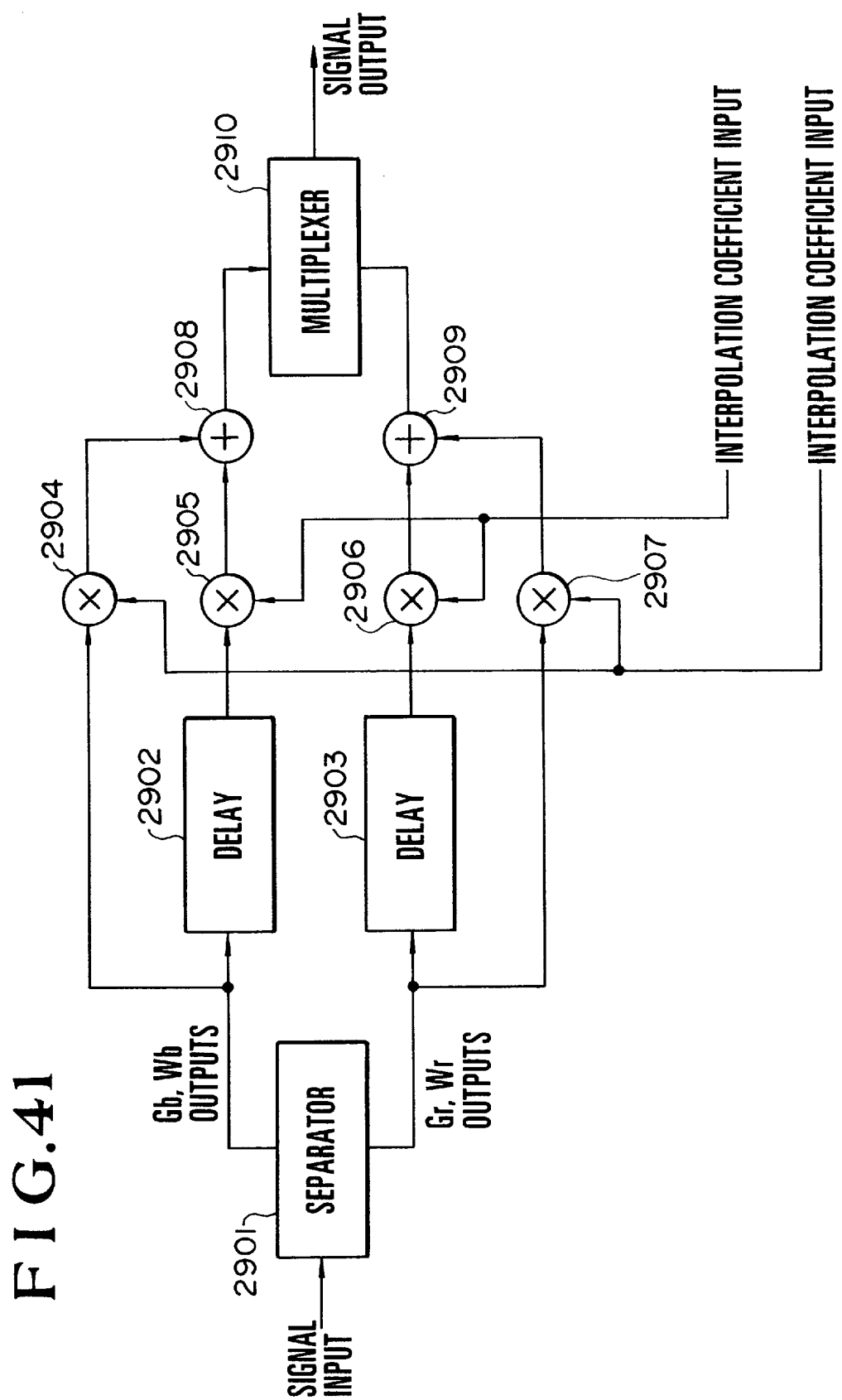
FIG. 41 is a block diagram of a signal interpolator of the embodiment of the present invention.

The image pickup unit 2704 outputs a signal in the above-described general pixel mixing and reading process. The signal output from the image pickup unit 2704 is temporarily stored in the buffer memory 2709 as in the full mode image pickup and is output to the signal processor 2714 in conformity to the operative speed of the main memory 2710. The signal interpolator 2716 performs signal interpolation using a method shown in FIG. 40. In this case, since two adjacent signal components of the input signal are different, signal interpolation cannot be performed using the previous method. FIG. 41 shows a specified structure of the signal interpolator 2716 of the present embodiment. Reference numeral 2901 denotes a separator; 2902, 2903 each, a delay unit; 2904–2907 each, a multiplier; 2908, 2909 each, an adder; and 2910, a multiplexer. Signals input in the sequence of Gr+Cy, Mg+Ye, . . . , or Mg+Cy, Gr+Ye, . . . are divided by the separator 2901 into Gr+Cy and Mg+Ye or Mg+Cy and Gr+Ye, and respective signals are interpolated by two interpolators in accordance with the format of FIG. 40.

Figure 42:
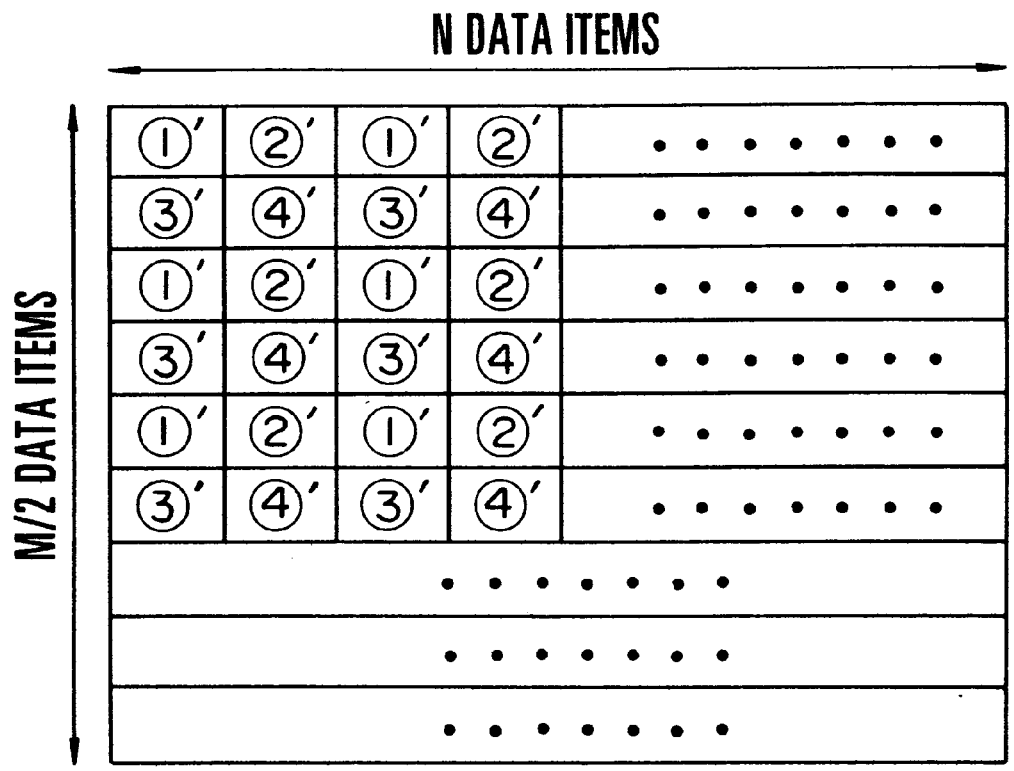
FIG. 42 is a signal format used in a pixel mixture reading operation in the embodiment of the present invention.

The signal interpolator 2716 records the thus interpolated signal in the main memory 2710. FIG. 42 shows the format of a signal recorded in the main memory 2710 in the economy mode. The signal recorded in the method used in the previous embodiments is different from the signal processing method in the full mode in reproduction. Thus, information on whether the signal is recorded in the full mode or in the economy mode is also recorded along with information on the white balancing.

Outputting a signal recorded in the economy mode will be described next. The signal recorded in the memory 2710 is input to the signal processor 2714 in a manner similar to that used in the reproduction in the full mode to produce an image signal of a predetermined format.

For example, in order to produce the three primary color signals R, G and B, the matrix operation of expression (15)

is performed to thereby interpolate the signals R, G and B as shown in FIG. 43.

In FIG. 43, $S_{1,1}$, $S_{1,2}$, $S_{1,3}$, $S_{2,1}$, $S_{2,2}$, $S_{2,3}$ each of which denoted by a circle show spatial distributed signals (uninterpolated) entering the signal interpolator of FIG. 41; $S_{1,1}'$, $S_{1,2}'$, $S_{1,3}'$, $S_{2,1}'$, $S_{2,2}'$, $S_{2,3}'$ each of which is denoted by a triangle show spatial distributed signals (interpolated) output from the signal interpolator. Since at this time the signal is read out in the pixel mixing process and signal interpolation were made as shown in FIG. 40, the uninterpolated signals are spaced one from another by an integer times Px and an integer times 2 Py in the horizontal and vertical directions, respectively, where Px and Py are horizontal and vertical pixel pitches. In this case, assume that the uninterpolated signals are spaced one from another by Px, 2 Py, for simplifying purposes. That is, the signals are spaced one from another at horizontal and vertical spacings of an integer times Px and an integer times Py in the space. Thus, the use of the signal interpolating method of FIG. 32 serves to equalize the spatial distributions of signals in the horizontal and vertical directions.

The image signals interpolated in the above method are increased in the horizontal direction in spacing. Thus, an aspect conversion is performed in the method of FIG. 21.

At this time, since the signal recorded in the main memory 2710 is output from the image pickup unit 2704 in the pixel mixing process, the number of data items in the vertical direction is reduced to ½ and the number of signals in the horizontal direction is reduced to ½ by the signal interpolator 2716, the number of signals is compressed to ¼ compared to the recording method using the full mode. According to the present process, four times the number of still pictures recorded in the full mode is recorded.

In order to select one of the full and economy modes, the full/economy selection switch 2719 is used. One of the recorded methods is selected depending on the mode which is selected by the full/economy selection switch 2719. The display 2720 displays the current recording process selected by the full/economy selection switch 2719 and also the remaining number of still pictures further recordable in the recording process selected at present.

According to the above embodiment, no detectors for detection of the illuminance and color temperature are required and an image signal for a still picture is produced using a general image pickup unit, so that an inexpensive image inputting means is provided.

Thus, a still picture recording digital camera is realized which provides a frame still picture with a reduced deterioration in the vertical resolution of the color signal but with high quality and which is capable of processing a dynamic image by switching the operation.

What is claimed is:

1. A still picture recording digital camera comprising:

an image pickup unit comprising a first group of parallel-spaced horizontal lines each including multiple opto-electric conversion elements each having color filters corresponding to a first and a second color, and a second group of horizontal lines each interleaved in two adjacent horizontal lines of said first group and having color filters corresponding to a third and a fourth color;

an output unit which outputs signals from said image pickup unit in a predetermined manner;

a color interpolator which interpolates and outputs color signals corresponding to the first-fourth colors on the basis of the signals output at least from said output unit, said color interpolator having interpolation coefficients used for interpolating purposes and switched at intervals of one horizontal scanning period; and a signal processor which produces a color signal or a luminance signal having a predetermined format on the basis of the color signals interpolated and produced by said color interpolator;

wherein said output unit includes a delay unit which outputs the signals from said image pickup unit in the predetermined manner, and said output unit further includes a memory which stores the signals from said image pickup unit and outputs data therein, said delay unit receiving output signals of said image pickup unit from said memory for outputting the signals in the predetermined manner.

2. A still picture recording digital camera according to claim 1, wherein said delay unit includes at least two series connected one-horizontal scan delay units for receiving and delaying a signal output from said image pickup unit by one horizontal scanning period.

3. A still picture recording digital camera according to claim 1, wherein said delay unit includes at least four series connected one-horizontal scan delay units for receiving and delaying a signal output from said image pickup unit by one horizontal scanning period.

4. A still picture recording digital camera according to claim 1, wherein the delay unit outputs the signals from said image pickup unit in a line progressive manner as corresponding delayed signals different in delay time.

5. A still picture recording digital camera according to claim 1, wherein said memory includes a frame memory outputting the data stored in said frame memory in the same sequence as the group of horizontal lines of said image pickup unit.

6. A still picture recording digital camera according to claim 1, wherein said signal processor comprises at least an R, G and B matrix.

7. A still picture recording digital camera according to claim 1, wherein said signal processor generates at least R-Y and B-Y color difference signals.

8. A still picture recording digital camera according to claim 1, wherein said delay unit delays the output signals from said image pickup unit and includes at least two series connected one-horizontal scan delay units, said color interpolator interpolates a one line signal using vertical three lines signals by delaying one-horizontal scan period with each of said one-horizontal scan delay units.

* * * * *